US008046384B2

(12) United States Patent
Saito et al.

(10) Patent No.: US 8,046,384 B2
(45) Date of Patent: Oct. 25, 2011

(54) INFORMATION PROCESSING APPARATUS, INFORMATION PROCESSING METHOD AND INFORMATION PROCESSING PROGRAM

(75) Inventors: Mari Saito, Kanagawa (JP); Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 11/926,937

(22) Filed: Oct. 29, 2007

(65) Prior Publication Data

US 2008/0140716 A1 Jun. 12, 2008

(30) Foreign Application Priority Data

Dec. 8, 2006 (JP) ................................ P2006-331474

(51) Int. Cl.
*G06F 17/30* (2006.01)

(52) U.S. Cl. ........................................ 707/802; 707/803

(58) Field of Classification Search ............... 707/104.1, 707/802, 803
See application file for complete search history.

(56) References Cited

U.S. PATENT DOCUMENTS

| | | | | |
|---|---|---|---|---|
| 2004/0168190 | A1* | 8/2004 | Saari et al. | 725/46 |
| 2005/0246734 | A1* | 11/2005 | Kover et al. | 725/24 |
| 2006/0242185 | A1* | 10/2006 | Paulus | 707/102 |
| 2007/0206606 | A1* | 9/2007 | Coleman et al. | 370/395.52 |
| 2007/0243509 | A1* | 10/2007 | Stiebel | 434/236 |
| 2007/0269788 | A1* | 11/2007 | Flowers et al. | 434/350 |
| 2008/0097867 | A1* | 4/2008 | Engle | 705/26 |

FOREIGN PATENT DOCUMENTS

| | | |
|---|---|---|
| JP | 2003-16095 | 1/2003 |
| JP | 2005-128884 | 5/2005 |

* cited by examiner

*Primary Examiner* — Rehana Perveen
*Assistant Examiner* — Tiffany Thuy Bui
(74) *Attorney, Agent, or Firm* — Finnegan, Henderson, Farabow, Garrett & Dunner, L.L.P.

(57) ABSTRACT

Disclosed herein is an information processing apparatus including, a user group identification section, a first content analysis section, a second content analysis section, and a metadata setting section.

10 Claims, 13 Drawing Sheets

FIG. 8

| TEST CONTENT | CATEGORY | | |
|---|---|---|---|
| | USER GROUP X | USER GROUP Y | ... |
| 1 | $X_2$ | $Y_1$ | ... |
| 2 | $X_3$ | $Y_1$ | ... |
| 3 | $X_1$ | $Y_3$ | ... |
| 4 | $X_1$ | $Y_4$ | ... |
| 5 | $X_3$ | $Y_2$ | ... |
| ⋮ | ⋮ | ⋮ | |

FIG. 9

| TEST CONTENT | CHARACTERISTICS | | | | | |
|---|---|---|---|---|---|---|
| | VOLUME | RHYTHM | HARMONY | GENRE | ARTIST | ... |
| 1 | $a_1$ | $b_3$ | $c_3$ | $d_2$ | $e_1$ | ... |
| 2 | $a_2$ | $b_3$ | $c_3$ | $d_4$ | $e_1$ | ... |
| 3 | $a_3$ | $b_1$ | $c_1$ | $d_3$ | $e_3$ | ... |
| 4 | $a_4$ | $b_1$ | $c_2$ | $d_3$ | $e_4$ | ... |
| 5 | $a_2$ | $b_3$ | $c_4$ | $d_4$ | $e_5$ | ... |
| ... | ... | ... | ... | ... | ... | |

FIG. 10

| TARGET CONTENT | CHARACTERISTICS | | | | | | METADATA | | |
|---|---|---|---|---|---|---|---|---|---|
| | VOLUME | RHYTHM | HARMONY | GENRE | ARTIST | ... | USER GROUP X | USER GROUP Y | ... |
| 1 | $a_2$ | $b_3$ | $c_4$ | $d_3$ | $e_5$ | ... | $X_3$ | $Y_2$ | ... |
| 2 | $a_4$ | $b_1$ | $c_1$ | $d_3$ | $e_3$ | ... | $X_1$ | $Y_4$ | ... |
| 3 | $a_2$ | $b_1$ | $c_1$ | $d_3$ | $e_3$ | ... | $X_1$ | $Y_3$ | ... |
| 4 | $a_2$ | $b_2$ | $c_2$ | $d_4$ | $e_1$ | ... | $X_3$ | $Y_1$ | ... |
| 5 | $a_1$ | $b_2$ | $c_3$ | $d_2$ | $e_2$ | ... | $X_2$ | $Y_1$ | ... |
| ⋮ | ⋮ | ⋮ | ⋮ | ⋮ | ⋮ | | ⋮ | ⋮ | |

INFORMATION PROCESSING APPARATUS, INFORMATION PROCESSING METHOD AND INFORMATION PROCESSING PROGRAM

CROSS REFERENCES TO RELATED APPLICATIONS

The present invention contains subject matter related to Japanese Patent Application JP 2006-331474 filed in the Japan Patent Office on Dec. 8, 2006, the entire contents of which being incorporated herein by reference.

BACKGROUND OF THE INVENTION

1. Field of the Invention

The present invention relates to an information processing apparatus, an information processing method and an information processing program. More particularly, the present invention relates to an information processing apparatus capable of setting information expressing how a human being feels in a content as metadata, an information processing method to be adopted by the information processing apparatus and an information processing program implementing the information processing method.

2. Description of the Related Art

In recent years, there have been proposed a variety of techniques for setting metadata in a musical content and making use of metadata set in the musical contents to recommend a specific musical content to a user.

The metadata set in a musical content includes information for identifying the content and other information on the content. The information for identifying a musical content includes the genre of the content, the name of an artist singing the content and the release date of the content. On the other hand, the other information on a musical content includes the sound volume, tempo and harmony of the content. In general, the other information on a musical content is information obtained as a result of carrying out signal processing on the content itself and analyzing the result of the signal processing.

Japanese Patent Laid-open No. 2003-16095 discloses a technique for making use of an evaluation, which is given to a content on the basis of pulse data, in a search for a specific content to be recommended to a user. On the other hand, Japanese Patent Laid-open No. 2005-128884 discloses a technique for creating a summary of a content typically on the basis of brain waves generated in a user when the user is viewing the content and/or listening to the content.

SUMMARY OF THE INVENTION

Information resulting from execution of signal processing on a musical content itself and an analysis of the result of the signal processing as information on the content is objective information expressing the characteristic of a signal representing the content. However, the information resulting from execution of signal processing on a musical content itself and an analysis of the result of the signal processing is not subjective information expressing how a human being listening to the content feels.

If subjective information can be set in a musical content as metadata for the content, it is possible to recommend a musical content to a user by making use of the feeling of a human being as a reference and such recommendation of a musical content to a user is considered to be useful. Let us assume for example that the user feels pleasant when listening to a specific musical content. In this case, if the information processing apparatus is capable of selecting another musical content that can make the user feel pleasant as the specific musical content does as a content to be listened to next, such an apparatus is useful to the user.

Even if the information processing apparatus is capable of recommending another musical content having attributes such a sound volume, a tempo and a harmony, which are similar to the specific musical content, on the basis of some characteristics of the content, it is actually impossible to clearly know whether or not the user really feels pleasant when listening to the other musical content. Thus, in recommending a musical content that will make the user feel pleasant, recommendation based on the feeling of the user as recommendation of a musical content to the user is considered to be a most direct approach.

Addressing the problems described above, inventors of the present invention have innovated a method for setting information representing how a human being feels in listening to a musical content in the content as metadata.

In accordance with an embodiment of the present invention, there is provided an information processing apparatus for setting metadata in a metadata-setting-target musical content on the basis of biological reactions exhibited by test participating persons each serving as a test participant during processes to output a plurality of test-object musical contents listened to by the test participating persons, the information processing apparatus including:

a user group identification section configured to identify a user group including test participating persons exhibiting similar biological reactions;

a first content analysis section configured to carry out signal processing in order to analyze every one of the test-object musical contents output to cause test participating persons pertaining to each of the user groups identified by the user group identification step to exhibit similar biological reactions;

a second content analysis section configured to carry out signal processing in order to analyze the metadata-setting-target musical content in which metadata is to be set; and a metadata setting section configured to set metadata in the metadata-setting-target musical content as metadata expressing information representing similar biological reactions exhibited by the test participating persons pertaining to the same user group when listening to the test-object musical contents analyzed by the first content analysis section to give an analysis result similar to an analysis result of the signal processing carried out by the second content analysis section on the metadata-setting-target musical content.

In accordance with another embodiment of the present invention, there is provided an information processing method adopted by an information processing apparatus for setting metadata in a metadata-setting-target musical content on the basis of biological reactions exhibited by test participating persons each serving as a test participant during processes to output a plurality of test-object musical contents listened to by the test participating persons, the information processing method including the steps of:

identifying a user group including test participating persons exhibiting similar biological reactions;

primarily carrying out signal processing in order to analyze every one of the test-object musical contents output to cause test participating persons pertaining to each of the user groups identified at the user group identification step to exhibit similar biological reactions;

secondarily carrying out signal processing in order to analyze the metadata-setting-target musical content in which metadata is to be set; and setting metadata in the metadata-setting-target musical content as metadata expressing information representing similar biological reactions exhibited by the test participating persons pertaining to the same user group during a process to output the test-object musical contents analyzed by the primarily carried out signal processing to give an analysis result similar to an analysis result of the secondarily carried out signal processing on the metadata-setting-target musical content.

In accordance with yet another embodiment of the present invention, there is provided an information processing program to be executed by a computer to carry out processing to set metadata in a metadata-setting-target musical content on the basis of biological reactions exhibited by test participating persons each serving as a test participant during processes to output a plurality of test-object musical contents listened to by the test participating persons, the information processing program including the steps of:

identifying a user group including test participating persons exhibiting similar biological reactions;

primarily carrying out signal processing in order to analyze every one of the test-object musical contents output to cause test participating persons pertaining to each of the user groups identified at the user group identification step to exhibit similar biological reactions;

secondarily carrying out signal processing in order to analyze the metadata-setting-target musical content in which metadata is to be set; and setting metadata in the metadata-setting-target musical content as metadata expressing information representing similar biological reactions exhibited by the test participating persons pertaining to the same user group during a process to output the test-object musical contents analyzed by the primarily carried out signal processing to give an analysis result similar to an analysis result of the secondarily carried out signal processing on the metadata-setting-target musical content.

In accordance with yet another embodiment of the present invention, there is provided an information processing apparatus for recommending a musical content to a user on the basis of metadata set in metadata-setting-target musical contents on the basis of biological reactions exhibited by test participating persons each serving as a test participant during processes to output a plurality of test-object musical contents listened to by the test participating persons by an apparatus including:

a first user group identification section configured to identify a user group including test participating persons exhibiting similar biological reactions;

a first content analysis section configured to carry out signal processing in order to analyze every one of the test-object musical contents output to cause test participating persons pertaining to each of the user groups identified by the first user group identification section to exhibit similar biological reactions;

a second content analysis section configured to carry out signal processing in order to analyze the metadata-setting-target musical content in which metadata is to be set; and a metadata setting section configured to set metadata in the metadata-setting-target musical content as metadata expressing information representing similar biological reactions exhibited by the test participating persons pertaining to the same user group when listening to the test-object musical contents analyzed by the first content analysis section to give an analysis result similar to an analysis result of the signal processing carried out by the second content analysis section on the metadata-setting-target musical content, the information processing apparatus including:

a second user group identification section configured to determine a user group including test participating persons exhibiting biological reactions during processes to output the test-object musical contents as biological reactions similar to biological reactions exhibited by the user, to which the musical content is to be recommended, during processes to output the test-object musical contents so as to include the user in the same user group as the determined user group; and a content recommendation section configured to recommend a musical content to the user on the basis of specific information selected from information, which has been set as metadata in metadata-setting-target musical contents, as specific information representing biological reactions exhibited by test participating persons pertaining to the same user group as the user group determined by the second user group identification section.

In accordance with yet another embodiment of the present invention, there is provided an information processing method adopted by an information processing apparatus for recommending a musical content to a user on the basis of metadata set in metadata-setting-target musical contents on the basis of biological reactions exhibited by test participating persons each serving as a test participant during processes to output a plurality of test-object musical contents listened to by the test participating persons by an apparatus including:

a user group identification section configured to identify a user group including test participating persons exhibiting similar biological reactions;

a first content analysis section configured to carry out signal processing in order to analyze every one of the test-object musical contents output to cause test participating persons pertaining to each of the user groups identified by the user group identification section to exhibit similar biological reactions;

a second content analysis section configured to carry out signal processing in order to analyze the metadata-setting-target musical content in which metadata is to be set; and a metadata setting section configured to set metadata in the metadata-setting-target musical content as metadata expressing information representing similar biological reactions exhibited by the test participating persons pertaining to the same user group when listening to the test-object musical contents analyzed by the first content analysis section to give an analysis result similar to an analysis result of the signal processing carried out by the second content analysis section on the metadata-setting-target musical content, the information processing method including the steps of:

determining a user group including test participating persons exhibiting biological reactions during processes to output the test-object musical contents as biological reactions similar to biological reactions exhibited by the user, to which the musical content is to be recommended, during processes to output the test-object musical contents so as to include the user in the same user group as the determined user group; and recommending a musical content to the user on the basis of specific information selected from information, which has been set as metadata in metadata-setting-target musical contents, as specific information representing biological reactions exhibited by test participating persons pertaining to the same user group as the user group determined at the user group identification step.

In accordance with yet another embodiment of the present invention, there is provided an information processing program to be executed by a computer for carrying out processing to recommend a musical content to a user on the basis of metadata set in metadata-setting-target musical contents on the basis of biological reactions exhibited by test participating persons each serving as a test participant during processes to output a plurality of test-object musical contents listened to by the test participating persons by an apparatus including:

a user group identification section configured to identify a user group including test participating persons exhibiting similar biological reactions;

a first content analysis section configured to carry out signal processing in order to analyze every one of the test-object musical contents output to cause test participating persons pertaining to each of the user groups identified by the user group identification section to exhibit similar biological reactions;

a second content analysis section configured to carry out signal processing in order to analyze the metadata-setting-target musical content in which metadata is to be set; and a metadata setting section configured to set metadata in the metadata-setting-target musical content as metadata expressing information representing similar biological reactions exhibited by the test participating persons pertaining to the same user group when listening to the test-object musical contents analyzed by the first content analysis section to give an analysis result similar to an analysis result of the signal processing carried out by the second content analysis section on the metadata-setting-target musical content, the information processing program including the steps of:

determining a user group including test participating persons exhibiting biological reactions during processes to output the test-object musical contents as biological reactions similar to biological reactions exhibited by the user, to which the musical content is to be recommended, during processes to output the test-object musical contents so as to include the user in the same user group as the determined user group; and recommending a musical content to the user on the basis of specific information selected from information, which has been set as metadata in metadata-setting-target musical contents, as specific information representing biological reactions exhibited by test participating persons pertaining to the same user group as the user group determined at the user group identification step.

BRIEF DESCRIPTION OF THE DRAWINGS

FIG. 8 shows typical category values assigned to test-object musical contents each serving as an assignee listened to by test participating persons pertaining to a user group;

FIG. 9 is shows typical characteristic values of each of test-object musical contents;

FIG. 10 shows characteristic values of metadata-setting-target musical contents and metadata set in the metadata-setting-target musical contents;

DETAILED DESCRIPTION OF THE PREFERRED EMBODIMENTS

Before preferred embodiments of the present invention are explained, relations between disclosed inventions and the embodiments described in this specification and/or shown in diagrams are explained in the following comparative description. Embodiments supporting the disclosed inventions are described in this specification and/or shown in diagrams. It is to be noted that, even if there is an embodiment described in this specification and/or shown in diagrams but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention.

Figure 4:
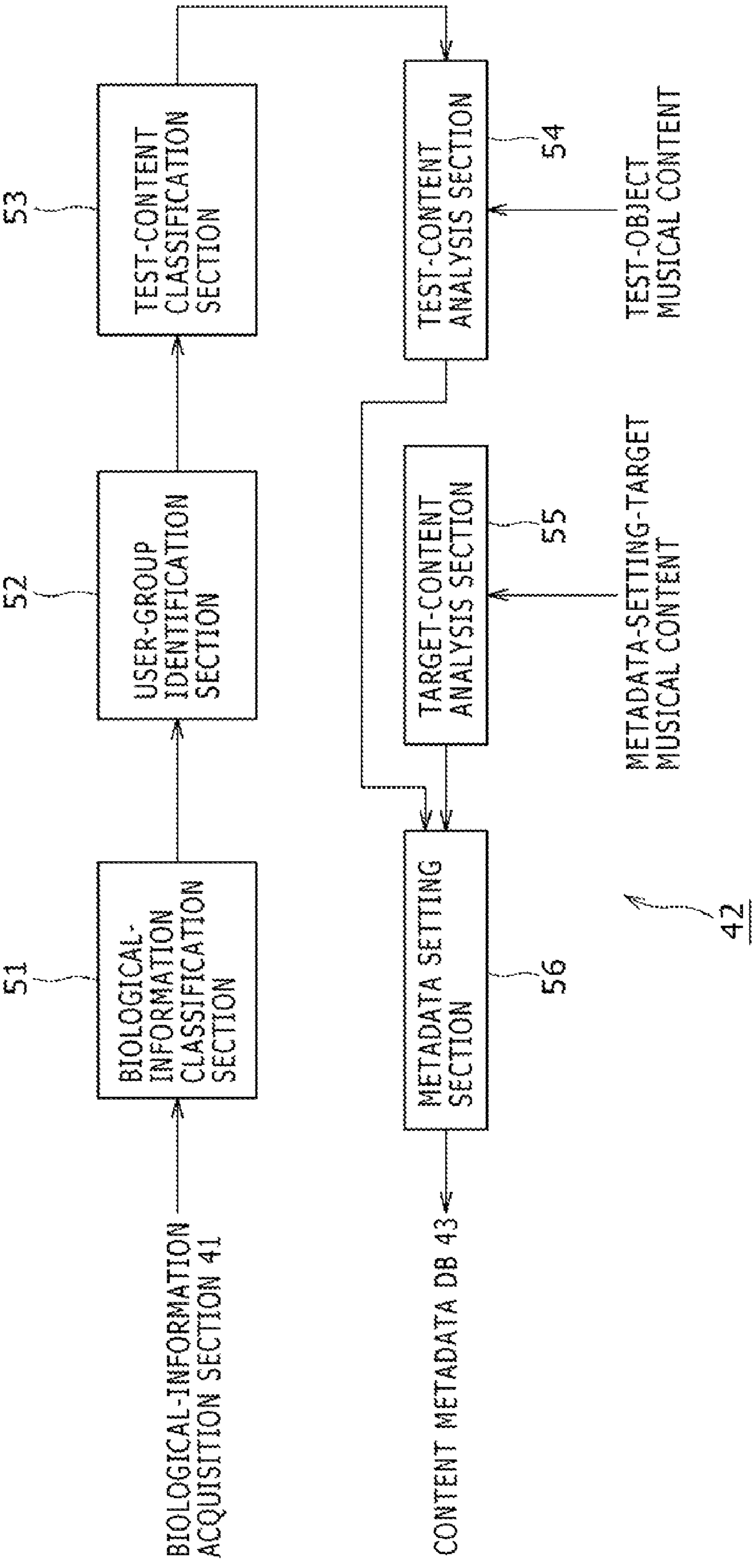
FIG. 4 is a block diagram showing a typical configuration of a biological-information processing section 42 included in the information processing apparatus shown in FIG. 3.

In accordance with a first embodiment of the present invention, there is provided an information processing apparatus (such as an information processing apparatus 1 shown in FIG. 1) for setting metadata in a metadata-setting-target musical content on the basis of biological reactions exhibited by test participating persons each serving as a test participant during processes to output a plurality of test-object musical contents listened to by the test participating persons. The information processing apparatus employs:

a user group identification section (such as a user-group identification section 52 included in a biological-information processing section 42 shown in FIG. 4) configured to identify a user group including test participating persons exhibiting similar biological reactions;

a first content analysis section (such as a test-content analysis section 54 included in the biological-information processing section 42 shown in FIG. 4) configured to carry out signal processing in order to analyze every one of the test-object musical contents output to cause test participating persons pertaining to each of the user groups identified by the user group identification section to exhibit similar biological reactions;

a second content analysis section (such as a target-content analysis section 55 included in the biological-information processing section 42 shown in FIG. 4) configured to carry out signal processing in order to analyze the metadata-setting-target musical content in which metadata is to be set; and a metadata setting section (such as a metadata setting section 56 included in a biological-information processing section 42 shown in FIG. 4) configured to set metadata in the metadata-setting-target musical content as metadata expressing information representing similar biological reactions exhibited by the test participating persons pertaining to the same user group when listening to the test-object musical contents analyzed by the first content analysis section to give an analysis result similar to an analysis result of the signal processing carried out by the second content analysis section on the metadata-setting-target musical content.

Figure 3:
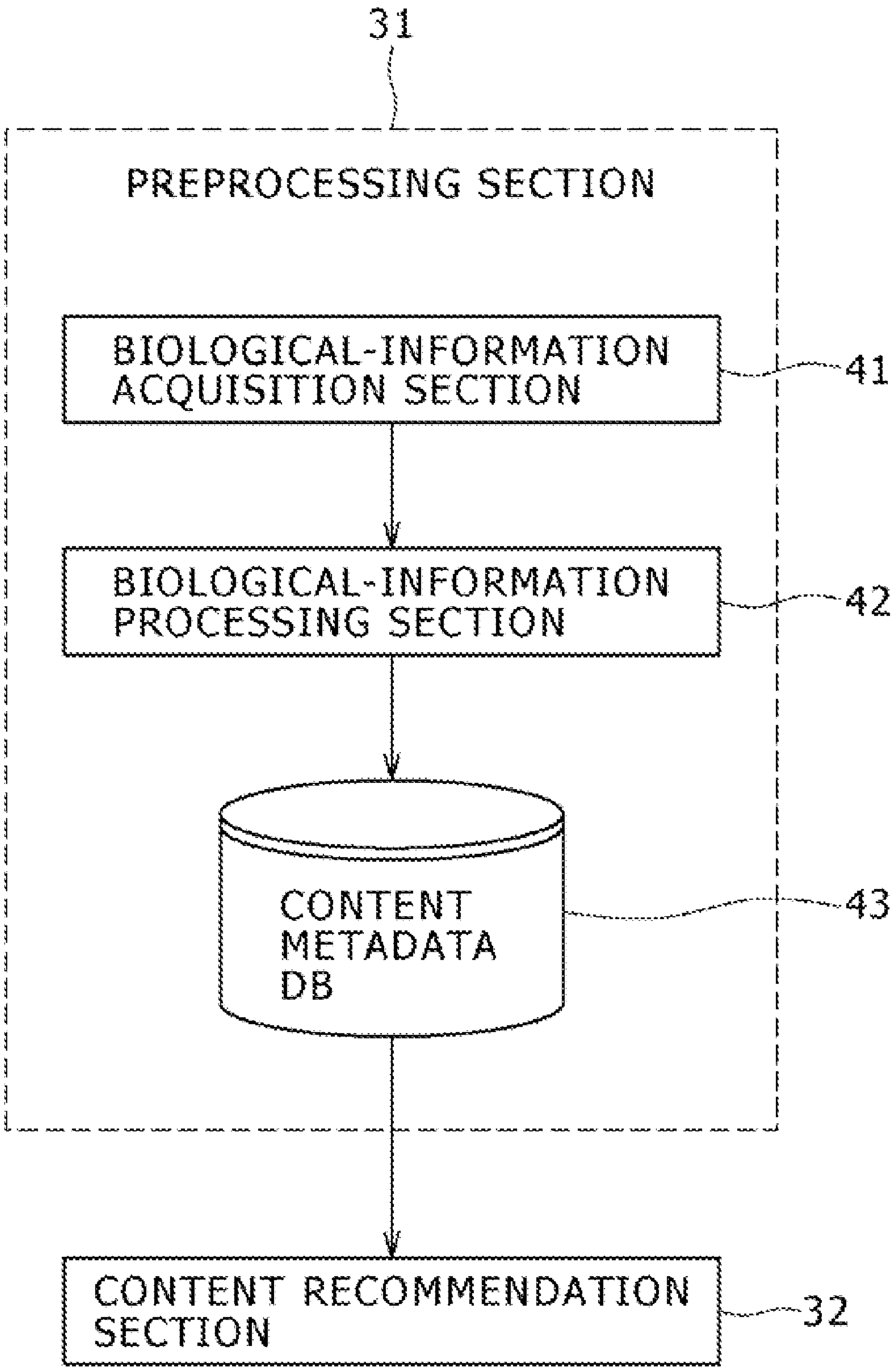
FIG. 3 is a block diagram showing a typical functional configuration of the information processing apparatus employed in the system shown in FIG. 1.

It is also possible to provide the information processing apparatus with a configuration further including a metadata recording section (such as a content metadata DB 43 included in a preprocessing section 31 shown in FIG. 3) configured to record metadata set by the metadata setting section in a memory.

It is also possible to provide the information processing apparatus with a configuration further including a content recommendation section (such as a content recommendation section 32 shown in FIG. 3) configured to recommend a content to a user on the basis of the metadata recorded in the memory by the metadata recording section.

In accordance the first embodiment of the present invention, there are also provided an information processing method for setting metadata in a metadata-setting-target musical content on the basis of biological reactions exhibited by test participating persons each serving as a test participant during processes to output a plurality of test-object musical contents and an information processing program implementing the information processing method. The information processing method and the information processing program each include:

a user group identification step (such as a step S2 included in a flowchart shown in FIG. 11) of identifying a user group including test participating persons exhibiting similar biological reactions;

a first content analysis step (such as the step S2 included in the flowchart shown in FIG. 11) of carrying out signal processing in order to analyze every one of the test-object musical contents output to cause test participating persons pertaining each of the same user groups identified in a process carried out at the user group identification step to exhibit similar biological reactions;

a second content analysis step (such as the step S2 included in the flowchart shown in FIG. 11) of carrying out signal processing in order to analyze the metadata-setting-target musical content in which metadata is to be set; and a metadata setting step (such as the step S2 included in the flowchart shown in FIG. 11) of setting metadata in the metadata-setting-target musical content as metadata expressing information representing similar biological reactions exhibited by the test participating persons pertaining to the same user group during a process to output the test-object musical contents analyzed at the first content analysis step to give an analysis result similar to an analysis result of the signal processing carried out at the second content analysis step on the metadata-setting-target musical content.

Figure 13:
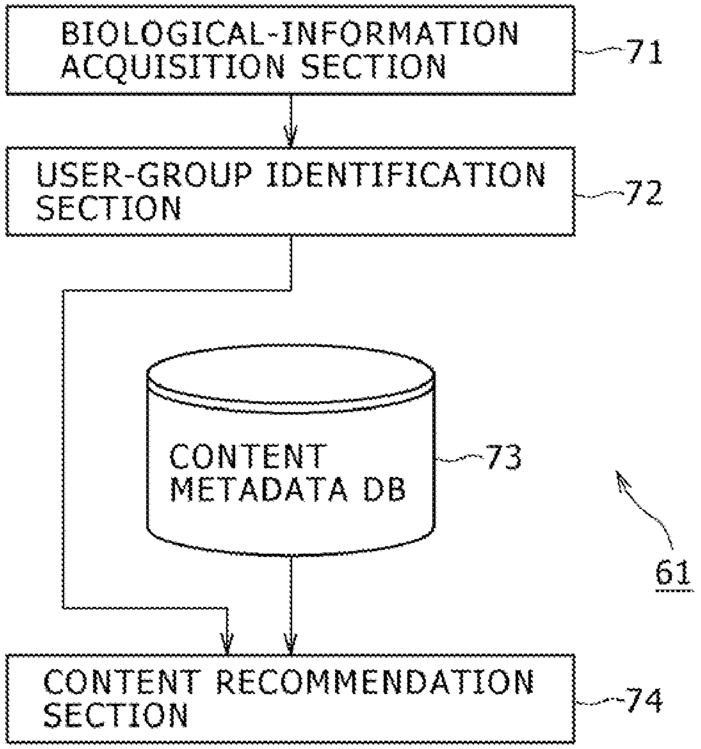
FIG. 13 is a block diagram showing a typical functional configuration of an information processing apparatus for recommending a musical content to a user.

In accordance with a second embodiment of the present invention, there is provided an information processing apparatus (such as an information processing apparatus 61 shown in FIG. 13) employing:

a user group identification section (such as a user-group identification section 72 employed in the information processing apparatus 61 shown in FIG. 13) configured to determine a user group including test participating persons exhibiting biological reactions during processes to output the test-object musical contents as biological reactions similar to biological reactions exhibited by the user, to which the musical content is to be recommended, during processes to output the test-object musical contents so as to include the user in the same user group as the determined user group; and a content recommendation section (such as a content recommendation section 74 employed in the information processing apparatus 61 shown in FIG. 13) configured to recommend a musical content to the user on the basis of specific information selected from information, which has been set as metadata in metadata-setting-target musical contents, as specific information representing biological reactions exhibited by test participating persons pertaining to the same user group as the user group determined by the user group identification section.

In accordance the second embodiment of the present invention, there are also provided an information processing method and an information processing program implementing the information processing method. The information processing method and the information processing program each include:

a user group identification step (such as a step S33 included in a flowchart shown in FIG. 14) of determining a user group including test participating persons exhibiting biological reactions during processes to output the test-object musical contents as biological reactions similar to biological reactions exhibited by the user, to which the musical content is to be recommended, during processes to output the test-object musical contents so as to include the user in the same user group as the determined user group; and a content recommendation step (such as the step S33 included in the flowchart shown in FIG. 14) of recommending a musical content to the user on the basis of specific information selected from information, which has been set as metadata in metadata-setting-target musical contents, as specific information representing biological reactions exhibited by test participating persons pertaining to the same user group as the user group determined at the user group identification step.

Embodiments of the present invention are explained by referring to diagrams as follows.

Figure 1:
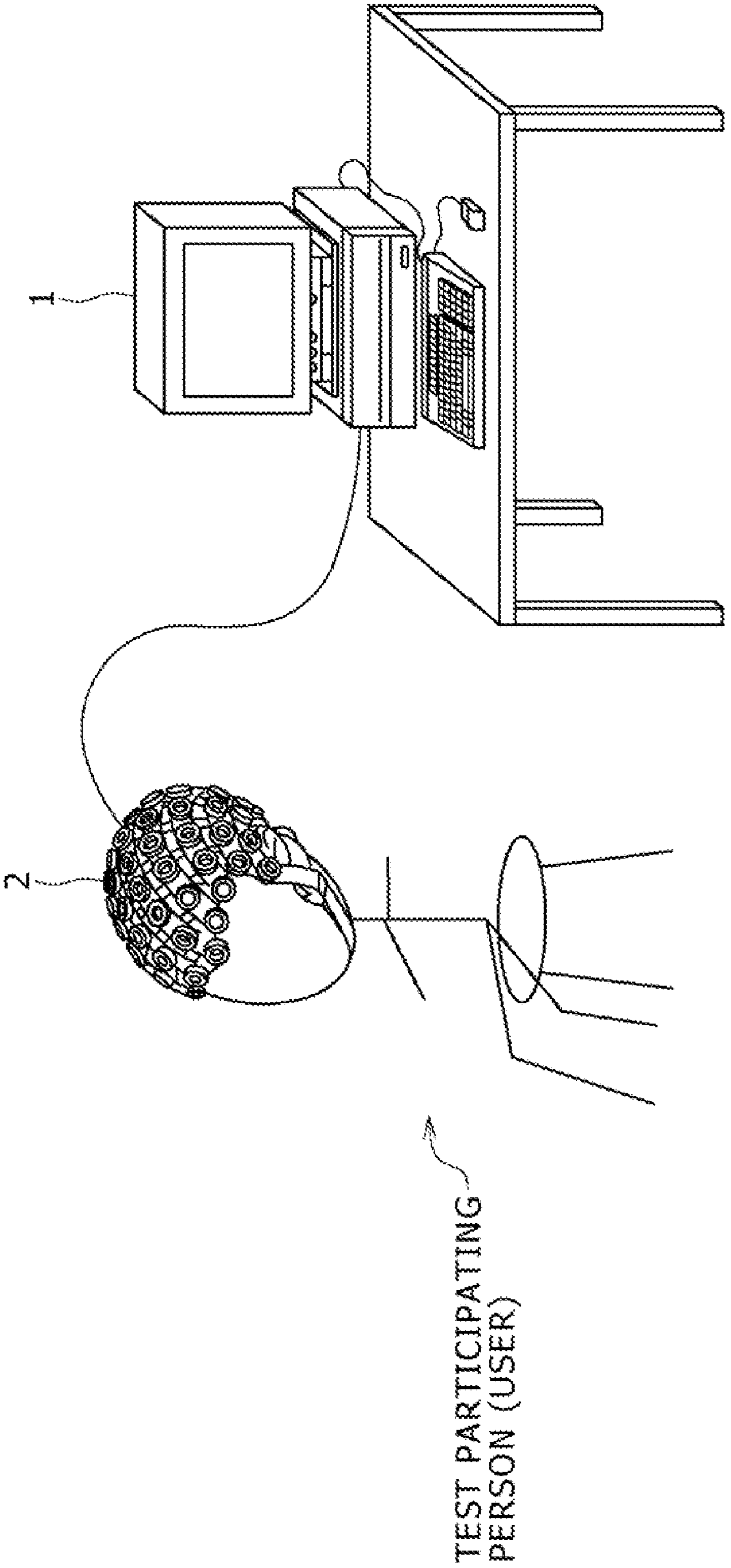
FIG. 1 is a diagram showing an external view of a system for setting metadata in a musical content by making use of an information processing apparatus according to an embodiment of the present invention.

FIG. 1 is a diagram showing an external view of a system for setting metadata in a musical content by making use of an information processing apparatus 1 according to an embodiment of the present invention.

As shown in FIG. 1, the information processing apparatus 1 is a computer having a display unit. A head gear 2 is connected to the information processing apparatus 1 by making use of a cable.

The head gear 2 is an apparatus mounted on a test participating person who participates in a test to acquire biological information representing biological reactions exhibited by the test participant to a reproduced musical content. A near infrared ray is radiated to the test participating person or the user. The system measures the amount of hemoglobin reacting to consumption of oxygen, which is required when the head of the test participating person listening to a musical content works. The reaction of hemoglobin to oxygen is referred to as a biological reaction cited above. Strictly speaking, the head of the test participating person works when the person listens to a sound output in an operation to reproduce a musical content. Biological information representing the biological reaction measured by the head gear 2 is supplied to the information processing apparatus 1.

In a process carried out by the information processing apparatus 1 to set metadata in a metadata-setting-target musical content, first of all, information representing biological reactions considered to be reactions, which are probably exhibited by a plurality of test participating persons if the test participating persons are actually listening to a metadata-setting-target musical content, is inferred from actual biological information obtained when the test participating persons are actually listening to a limited number of test-object musical contents. For example, the limited number of musical contents is 100. Then, the inferred information is set in the metadata-setting-target musical content as metadata.

In this world, the number of musical content is infinite. Thus, it is not realistic to let all test participating persons listen to all the musical contents and set metadata in a metadata-setting-target musical content for all contents and all test participating persons. For this reason, only a limited number of musical contents are each used as a test-object musical content and test participating persons are let listen to the test-object musical contents. Then, information inferred from actual biological information representing biological reactions exhibited by the test participating persons when listening to the test-object musical contents is set in a metadata-setting-target musical content as metadata. It is the information processing apparatus 1 that carries out the process to set the information inferred from biological information representing biological reactions exhibited by the test participating persons when listening to the test-object musical contents in a metadata-setting-target musical content as metadata.

Figure 2:
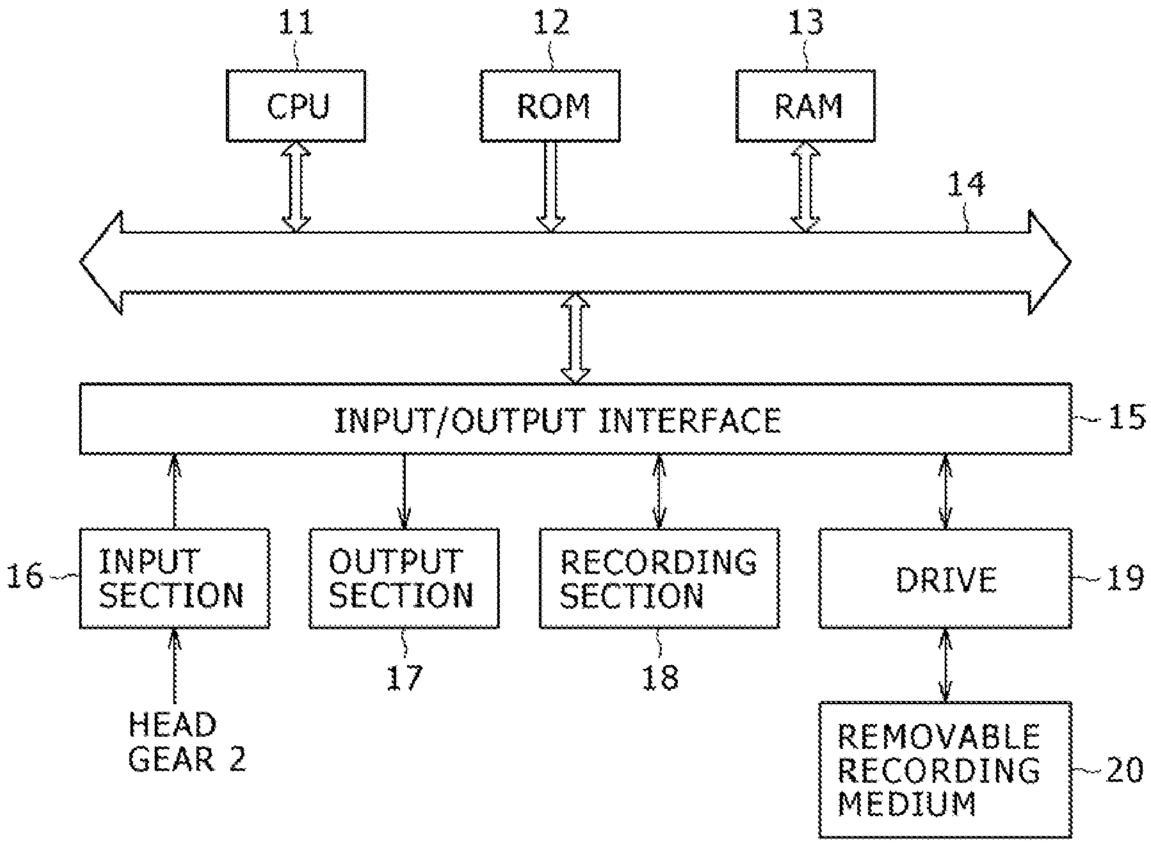
FIG. 2 is a block diagram showing a typical hardware configuration of the information processing apparatus employed in the system shown in FIG. 1.

FIG. 2 is a block diagram showing a typical hardware configuration of the information processing apparatus 1 employed in the system shown in FIG. 1.

In the information processing apparatus 1 shown in FIG. 2, a CPU (Central Processing Unit) 11 carries out various kinds of processing by execution of programs stored in a ROM (Read Only Memory) 12 or programs loaded from a recording section 18 into a RAM (Random Access Memory) 13. The RAM 13 is also used for properly storing various kinds of information such as data required in execution of the processing.

The CPU 11, the ROM 12 and the RAM 13 are connected to each other by a bus 14, which is also connected to an input/output interface 15.

The input/output interface 15 is connected to an input section 16, an output section 17, the recording section 18. The input section 16 is typically a terminal connected to a keyboard, a mouse and the head gear 2 cited before whereas the output section 17 includes a display unit and a speaker for outputting a sound obtained as a result of a process to reproduce a test-object musical content. The display unit is typically an LCD (Liquid Crystal Display) unit. The recording section 18 includes a hard disk. It is to be noted that, instead of having the information processing apparatus 1 carry out the process to reproduce a test-object musical content, this content reproduction process can also be carried out by another player.

As described above, the input/output interface 15 is connected to the drive 19 on which a removable recording medium 20 is mounted. The removable recording medium 20 can be a magnetic disk, an optical disk, a magneto-optical disk or a semiconductor memory.

FIG. 3 is a block diagram showing a typical functional configuration of the information processing apparatus 1 employed in the system shown in FIG. 1. At least some of functional sections shown in FIG. 3 are implemented by programs each determined in advance as a program to be executed by the CPU 11 employed in the hardware configuration of the information processing apparatus 1 shown in FIG. 2.

As shown in FIG. 3, the information processing apparatus 1 is implemented by a preprocessing section 31 and a content recommendation section 32. Processing carried out by the information processing apparatus 1 includes processing to set metadata in a metadata-setting-target musical content and processing to recommend a musical content to the user by making use of the set metadata. The processing to set metadata in a metadata-setting-target musical content is carried out by the preprocessing section 31 as preprocessing whereas the processing to recommend a musical content to the user by making use of the set metadata is processing carried out by the content recommendation section 32. The preprocessing section 31 includes a biological-information acquisition section 41, a biological-information processing section 42 and a content metadata DB (database) 43.

The biological-information acquisition section 41 included in the preprocessing section 31 is a section for acquiring biological information on the basis of a signal received from the head gear 2 and passing on the acquired information to the biological-information processing section 42.

For example, the biological-information acquisition section 41 acquires a time-axis sequence of pieces of information from the head gear 2 as the aforementioned biological information representing biological reactions. In this case, the biological reactions are a biological reaction exhibited by a user A when listening to test-object musical content 1, a biological reaction exhibited by the user A when listening to test-object musical content 2 and so on, a biological reaction exhibited by a user B when listening to test-object musical content 1, a biological reaction exhibited by the user B when listening to test-object musical content 2 and so on. That is to say, the biological information is a time-axis sequence of pieces of information representing biological reactions exhibited by a plurality of test participating persons, that is, the users A, B and so on, each listening to a plurality of test-object musical contents.

The biological-information processing section 42 is a section for setting metadata in a metadata-setting-target musical content on the basis of biological information received from the biological-information acquisition section 41 and supplying the metadata to the content metadata DB 43. The configuration of the biological-information processing section 42 and processing carried out by the biological-information processing section 42 to set metadata in a metadata-setting-target musical content will be explained later.

The content metadata DB 43 is a memory used for storing metadata received from the biological-information processing section 42. The content recommendation section 32 recommends a musical content to the user by properly making use of metadata stored in the content metadata DB 43.

The content recommendation section 32 is a section for recommending a musical content to the user by properly referring to metadata stored in the content metadata DB 43. For example, while a musical content is being reproduced, the content recommendation section 32 selects the same metadata from pieces of metadata, which are each stored in the content metadata DB 43 as the metadata of a musical content, as the metadata of the musical content being reproduced, and displays the attributes of a musical content associated with the selected metadata on a display unit. The attributes of a musical content include the title of the content and the name of an artist singing the content.

FIG. 4 is a block diagram showing a typical configuration of the biological-information processing section 42 included in the information processing apparatus 1 shown in FIG. 3.

As shown in FIG. 4, the biological-information processing section 42 includes a biological-information classification section 51, a user-group identification section 52, a test-content classification section 53, a test-content analysis section 54, a target-content analysis section 55 and a metadata setting section 56. Biological information output by the biological-information acquisition section 41 is supplied to the biological-information classification section 51.

The biological-information classification section 51 is a section for classifying the biological information received from the biological-information acquisition section 41 into a predetermined number of patterns and outputting the patterns obtained as a result of the classification to the user-group identification section 52.

As described before, the biological information is pieces of information forming a sequence stretched along the time axis. Thus, for example, the biological-information classification section 51 recognizes a correlation between pieces of biological information by taking delays between them into consideration and classifies the biological information into patterns.

In addition, the biological-information classification section 51 sets a predetermined number of representative shapes on the basis of distribution of characteristic points on a waveform representing the biological information. The characteristic points are maximum and minimum values of the biological information, that is, maximum and minimum values of the amount of hemoglobin. Then, the biological-information classification section 51 sequentially pays attention to pieces of biological information received from the biological-information acquisition section 41 and classifies the pieces of biological information into patterns each representing the representative shapes very similar to each other as shown in FIG. 5.

Figure 5A:
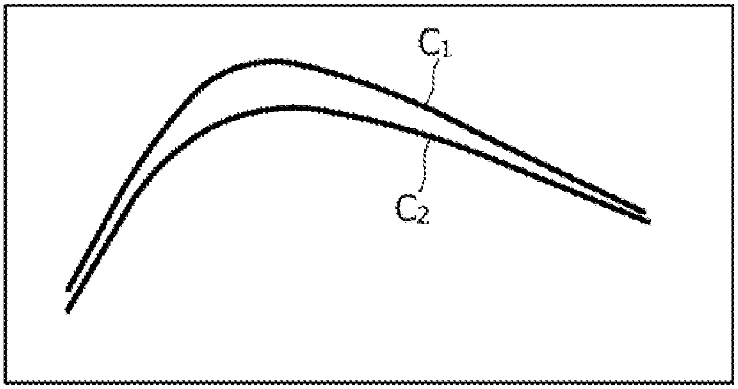
FIG. 5 is a diagram showing typical biological-information patterns each representing representative biological-information shapes very similar to each other.
Figure 5B:
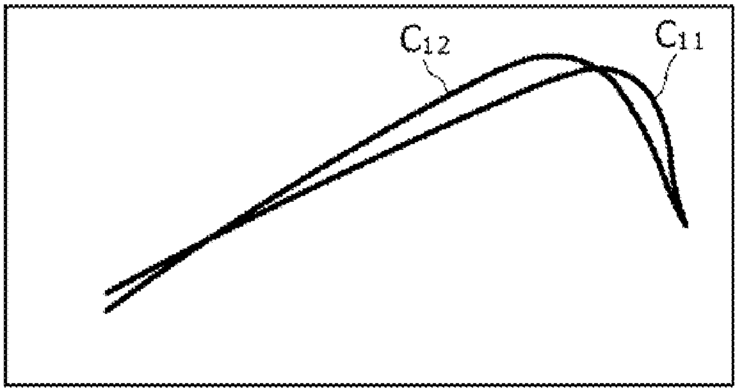
Figure 5C:
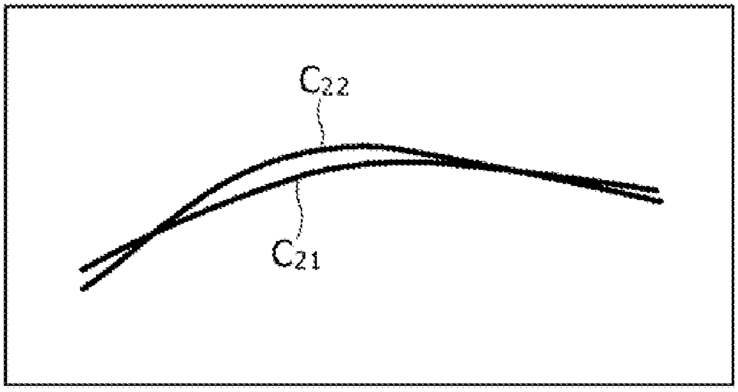

FIG. 5 is a diagram showing typical biological-information patterns each representing the representative biological-information shapes very similar to each other.

Curves $C_1$ and $C_2$ on the upper side of FIG. 5, curves $C_{11}$ and $C_{12}$ in the middle of the figure as well as curves $C_{21}$ and $C_{22}$ on the lower side of the figure each represent biological information. The horizontal direction of the figure is the direction of the time lapse whereas the vertical direction of the figure represents the amount of hemoglobin.

In the example shown in the figure, as a result of classification of the pieces of biological information, the curves $C_1$ and $C_2$ are put in a group referred to as a pattern A, the curves $C_{11}$ and $C_{12}$ are put in a group referred to as a pattern B and the curves $C_{21}$ and $C_{22}$ are put in a group referred to as a pattern C.

The biological information classified as described above is supplied to the user-group identification section 52.

On the basis of the biological information classified by the biological-information classification section 51, the user-group identification section 52 recognizes user groups each consisting of test participating persons exhibiting similar biological reactions and supplies information on the user groups to the test-content classification section 53.

Figure 6:
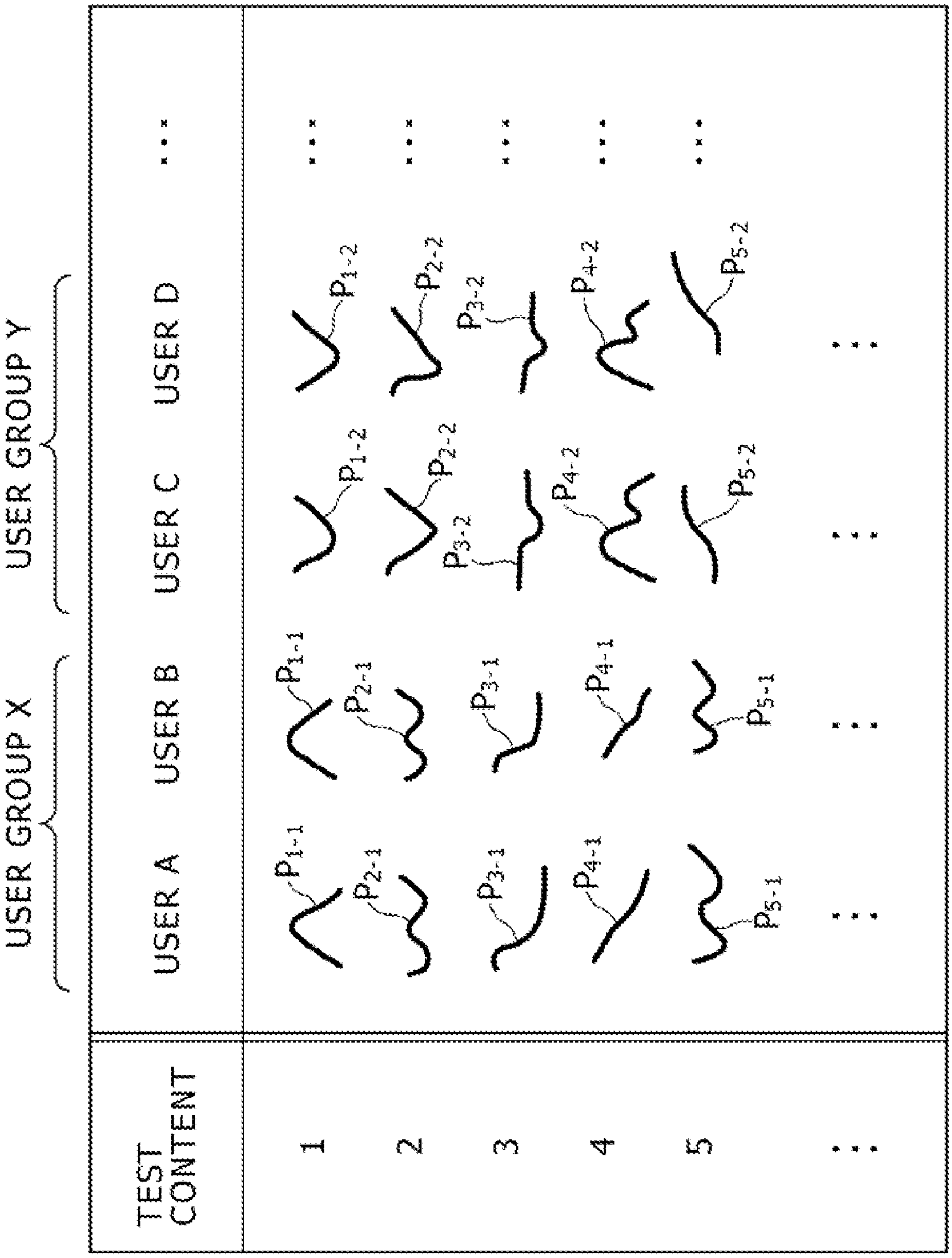
FIG. 6 is a diagram showing typical pieces of biological information, which are grouped into biological-information patterns P.

FIG. 6 is a diagram showing typical pieces of biological information, which are grouped into biological-information patterns P.

To put it in detail, FIG. 6 shows the waveforms of the pieces of biological information representing biological reactions exhibited by users (or test participating persons described before) A to D each serving as a test participating person when listening to test-object musical contents 1 to 5. Notation P denotes a pattern representing the classified biological information.

For example, the biological information representing a biological reaction exhibited by a user A pertaining to a user group X denoted by reference numeral 1 when listening to test-object musical content 1 and the biological information representing a biological reaction exhibited by a user B pertaining to the same user group as the user A when listening to test-object musical content 1 are put in the same group represented by a pattern $P_{1-1}$. By the same token, the biological information representing a biological reaction exhibited by a user C pertaining to a user group Y denoted by reference numeral 2 when listening to test-object musical content 1 and the biological information representing a biological reaction exhibited by a user D pertaining to the same user group as the user C when listening to test-object musical content 1 are put in the same group represented by a pattern $P_{1-2}$.

In the same way, the biological information representing a biological reaction exhibited by the user A when listening to test-object musical contents 2 to 5 and the biological information representing a biological reaction exhibited by the user B when listening to test-object musical contents 2 to 5 are put in the same group represented by patterns $P_{2-1}$, $P_{3-1}$, $P_{4-1}$ and $P_{5-1}$, respectively. By the same token, the biological information representing a biological reaction exhibited by the user C when listening to test-object musical contents 2 to 5 and the biological information representing a biological reaction exhibited by the user D when listening to test-object musical contents 2 to 5 are put in the same group represented by patterns $P_{2-2}$, $P_{3-2}$, $P_{4-2}$ and $P_{5-2}$, respectively.

In a process to obtain pieces of biological information representing biological reactions exhibited by the users A to D when listening to test-object musical contents 1 to 5, the pieces of biological information representing biological reactions exhibited by the user A are found similar to the pieces of biological information representing biological reactions exhibited by the user B. In this case, the users A and B are identified as users pertaining to the same user group X. By the same token, the pieces of biological information representing biological reactions exhibited by the user C are found similar to the pieces of biological information representing biological reactions exhibited by the user D. In this case, the users C and D are identified as users pertaining to the same user group Y.

In the case of the above example, the pieces of biological information representing biological reactions exhibited by the user A are found similar to the pieces of biological information representing biological reactions exhibited by the user B whereas the pieces of biological information representing biological reactions exhibited by the user C are found similar to the pieces of biological information representing biological reactions exhibited by the user D. In actuality, however, the pieces of biological information representing biological reactions exhibited by the user A may found partially different from the pieces of biological information representing biological reactions exhibited by the user B whereas the pieces of biological information representing biological reactions exhibited by user the C are found partially different from the pieces of biological information representing biological reactions exhibited by the user D.

The biological information represents the state of brain activity. Since the brain activity state of a user listening to a musical content is considered to vary in accordance with how the user feels when listening to the musical content, users pertaining to the same user group are users who feel in the same way when listening to test-object musical contents, that is, users who exhibit similar biological reactions to the characteristics of the musical contents. That is to say, users pertaining to the same user group are users who have the same way of listening test-object musical contents. The way of listening to even the same musical content may vary from user to user. For example, a user unconsciously exhibits a biological reaction to a fixed tempo of a musical content when listening to the musical content while another user unconsciously exhibits a biological reaction to a fixed frequency of the voice of a singer when listening to a musical content sung by the singer.

Figure 7:
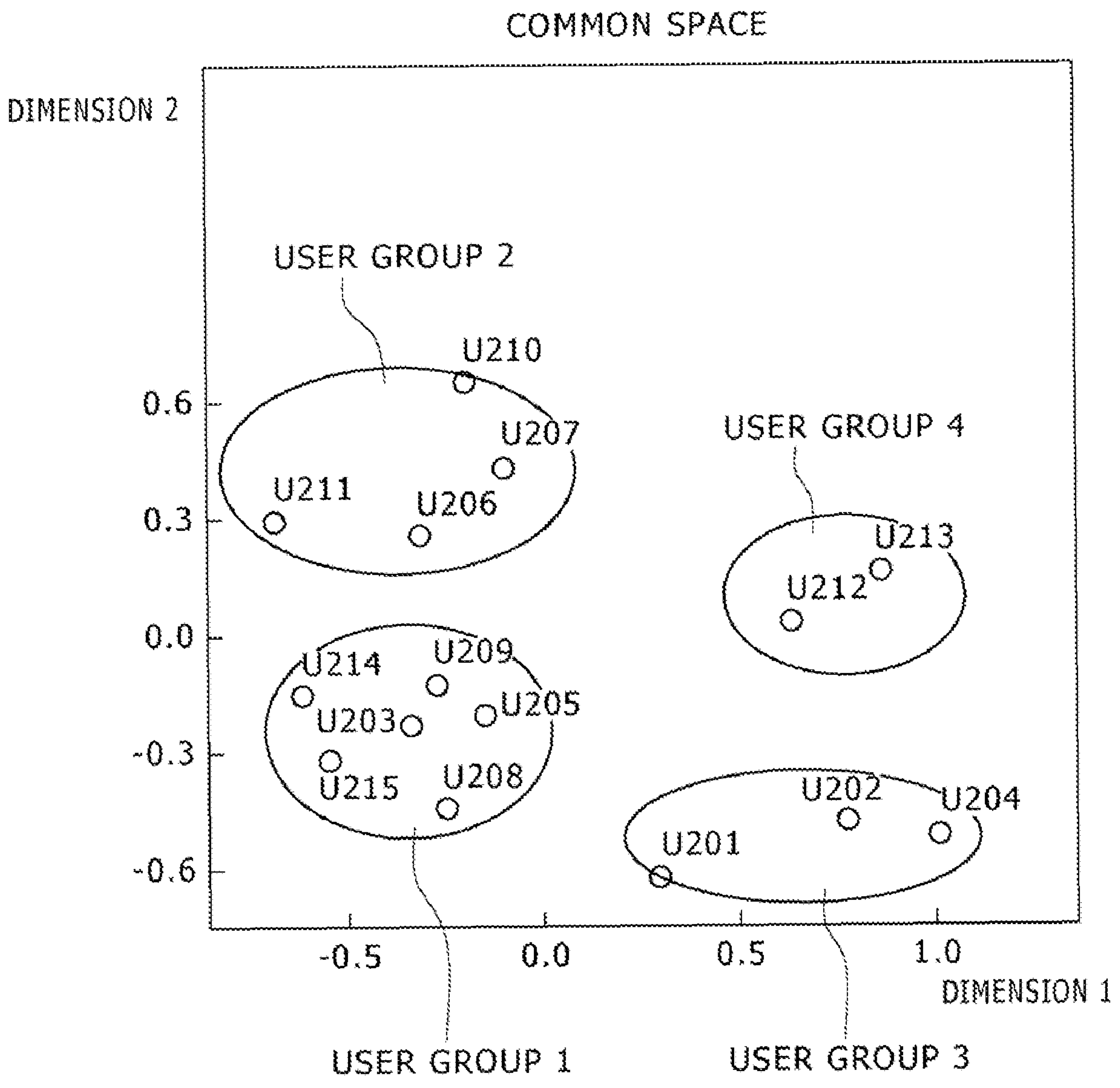
FIG. 7 is a diagram showing typical grouping of users.

FIG. 7 is a diagram showing typical grouping of users (or test participating persons described earlier).

For example, users are mapped onto a space common to the users on the basis of biological information representing biological reactions exhibited by the users when listening to test-object musical contents. Then, distances between users are measured by typically adopting an optimum measuring method. Finally, users separated from each other by short distances are put in the same user group.

In the typical user grouping shown in FIG. 7, the horizontal axis represents the first dimension, which is an element obtained from biological information, whereas the vertical axis represents the second dimension, which is another element obtained from biological information. The first and second dimensions define a space onto which users are mapped. In the space, the users are clustered into user groups 1 to 4. For example, user group 1 is created as a group including users denoted by notations U203, U205, U208, U209, U214 and U215.

The user-group identification section 52 supplies information on each of user groups recognized in this way and the biological information used as a basis to recognize the user groups to the test-content classification section 53.

The test-content classification section 53 included in the biological-information processing section 42 shown in FIG. 4 receives information on user groups recognized in this way and the biological information from the user-group identification section 52. Then, on the basis of the information on the user groups and the biological information, which are received from the user-group identification section 52, the test-content classification section 53 forms a table and assigns a category value to the individual test-object musical content in order to indicate that the specific users exhibit similar biological reactions when listening to the individual test-object musical content. Since a category value is set in accordance with biological information representing biological reactions exhibited by users, a category value is also information representing biological information.

The relation between the category and the biological information is explained in detail as follows. Let us assume for example that the biological information shown in FIG. 6 is obtained and consider category values assigned to test-object musical contents each serving as an assignee listened to by users A and B pertaining to the user group X shown in the table of FIG. 8 as a user group including the users A and B as shown in FIG. 6. As shown in FIG. 6, there are no other patterns similar to the pattern $P_{1-1}$, for test-object musical content 1 in the user group X. Thus, since test-object musical content 1 producing biological information similar to biological information representing biological reactions exhibited by the users A and B when listening to test-object musical content 1 is the only musical content among test-object musical contents 1 to 5, a category value of $X_2$ unique to test-object musical content 1 is set for (or assigned to) test-object musical content 1 as shown in the table of FIG. 8.

On the other hand, also as shown in FIG. 6, the shape of the pattern $P_{2-1}$ of biological information representing biological reactions exhibited by the users A and B when listening to test-object musical content 2 is similar to the shape of the pattern $P_{5-1}$ of biological information representing biological reactions exhibited by the users A and B when listening to test-object musical content 5. That is to say, the pieces of biological information produced by test-object musical content 2 as biological information representing biological reactions exhibited by the users A and B when listening to test-object musical content 2 are similar to the pieces of biological information produced by test-object musical content 5 as biological information representing biological reactions exhibited by the users A and B when listening to test-object musical content 5. Thus, a category value of $X_3$ common to test-object musical contents 2 and 5 is set for both test-object musical contents 2 and 5 as shown in the table of FIG. 8.

By the same token, the shape of the pattern $P_{3-1}$ of biological information representing biological reactions exhibited by the users A and B when listening to test-object musical content 3 is similar to the shape of the pattern $P_{4-1}$ of biological information representing biological reactions exhibited by the users A and B when listening to test-object musical content 4 as shown in FIG. 6. That is to say, the pieces of biological information produced by test-object musical content 3 as biological information representing biological reactions exhibited by the users A and B when listening to test-object musical content 3 are similar to the pieces of biological information produced by test-object musical content 4 as biological information representing biological reactions exhibited by the users A and B when listening to test-object musical content 4. Thus, a category value of $X_1$ common to test-object musical contents 3 and 4 is set for both test-object musical contents 3 and 4 as shown in the table of FIG. 8.

Next, let us consider category values assigned to test-object musical contents each serving as an assignee listened to by users C and D pertaining to the user group Y shown in the table of FIG. 8 as a user group including the users C and D as shown in FIG. 6. In this case, as shown in FIG. 6, the shape of the pattern $P_{1-2}$ of biological information representing biological reactions exhibited by the users C and D when listening to test-object musical content 1 is similar to the shape of the pattern $P_{2-2}$ of biological information representing biological reactions exhibited by the users C and D when listening to test-object musical content 2. That is to say, the pieces of biological information produced by test-object musical content 1 as biological information representing biological reactions exhibited by the users C and D when listening to test-object musical content 1 are similar to the pieces of biological information produced by test-object musical content 2 as biological information representing biological reactions exhibited by the users C and D when listening to test-object musical content 2. Thus, a category value of $Y_1$ common to test-object musical contents 1 and 2 is set for both test-object musical contents 1 and 2 as shown in the table of FIG. 8.

As shown in FIG. 6, there are no other patterns similar to the pattern $P_{3-2}$ for test-object musical content 3 in the user group Y. Thus, since musical content 3 producing biological information similar to biological information representing biological reactions exhibited by the users C and D when listening to test-object musical content 3 is the only musical content among test-object musical contents 1 to 5, a category value of $Y_3$ unique to test-object musical content 3 is set for test-object musical content 3 as shown in the table of FIG. 8.

By the same token, as shown in FIG. 6, there are no other patterns similar to the pattern $P_{4-2}$ for test-object musical content 4 in the user group Y. Thus, since musical content 4 producing biological information similar to biological information representing biological reactions exhibited by the users C and D when listening to test-object musical content 4 is the only musical content in test-object musical contents 1 to 5, a category value of $Y_4$ unique to test-object musical content 4 is set for test-object musical content 4 as shown in the table of FIG. 8.

Likewise, as shown in FIG. 6, there are no other patterns similar to the pattern $P_{5-2}$ for test-object musical content 5 in the user group Y. Thus, since musical content 5 producing biological information similar to biological information representing biological reactions exhibited by the users C and D when listening to test-object musical content 5 is the only musical content in test-object musical contents 1 to 5, a category value of $Y_2$ unique to test-object musical content 5 is set for test-object musical content 5 as shown in the table of FIG. 8.

FIG. 8 is the table showing the typical category values assigned to the test-object musical contents 1 to 5 serving as assignees listened to by test participating persons pertaining to the user groups X and Y described above.

As shown in the table of FIG. 8, in the user group X, the category value of $X_2$ unique to test-object musical content 1 is set for (or assigned to) test-object musical content 1, the category value of $X_3$ common to test-object musical contents 2 and 5 is set for both test-object musical contents 2 and 5 whereas the category value of $X_1$ common to test-object musical contents 3 and 4 is set for both test-object musical contents 3 and 4.

In the user group Y, on the other hand, the category value of $Y_1$ common to test-object musical contents 1 and 2 is set for both test-object musical contents 1 and 2, the category value of $Y_3$ unique to test-object musical content 3 is set for test-object musical content 3, the category value of $Y_4$ unique to test-object musical content 4 is set for test-object musical content 4 whereas the category value of $Y_2$ unique to test-object musical content 5 is set for test-object musical content 5.

Test-object musical contents associated with the same category value are musical contents, which arouse similar feelings in particular users (or test participating persons) pertaining to the same user group when the particular users are listening to the test-object musical contents. That is to say, such particular users form a subgroup identified by the category value in the user group as a subgroup of users listening to specific test-object musical contents. As described earlier, users pertaining to the same user group are users having similar ways of listening to the same musical content or users exhibiting similar biological reactions to the same musical content.

For example, test-object musical contents 2 and 5 associated with the category value of $X_3$ as a result of classifying the test-object musical contents as shown in the table of FIG. 8 can be said to be musical contents, which arouse similar feelings in users when each of the users is listening to the musical contents in a musical-content listening way similar to the users A and B pertaining to the same user group X, that is, if the users can be regarded as users pertaining to the user group X. By the same token, test-object musical contents 3 and 4 pertaining to the category value of $X_1$ as a result of classifying the test-object musical contents can be said to be musical contents, which arouse similar feelings in users when each of the users is listening to the musical contents in a musical-content listening way similar to the users A and B pertaining to the same user group X, that is, if the users can be regarded as users pertaining to the user group X.

For example, when each of users is listening to test-object musical content 2 or 5 in a musical-content listening way similar to the users A and B, test-object musical content 2 or 5 arouses similar feelings in the users. When each of users is listening to test-object musical content 2 or 5 in a musical-content listening way similar to the users C and D pertaining to the same user group Y, however, test-object musical content 2 or 5 arouses different feelings in the users.

On the other hand, test-object musical contents 1 and 2 pertaining to the category value of $Y_1$ as a result of classifying the test-object musical contents can be said to be musical contents, which arouse similar feelings in users when each of the users is listening to the musical contents in a musical-content listening way similar to the users C and D pertaining to the same user group Y.

The test-content classification section 53 supplies category values to the test-content analysis section 54, which also receives the test-object musical contents.

The test-content analysis section 54 included in the biological-information processing section 42 as shown in FIG. 4 carries out signal processing on each of the test-object musical contents in order to analyze objective characteristics of each of the test-object musical contents. The objective characteristics of a test-object musical content include the sound volume, rhythm and harmony of the test-object musical content. The test-content analysis section 54 supplies the characteristic values obtained as a result of the signal processing carried out by the test-content analysis section 54 to the metadata setting section 56 along with the category values received from the test-content classification section 53.

FIG. 9 is shows typical characteristic values of each of test-object musical contents.

To be more specific, FIG. 9 shows characteristic values obtained as a result of the signal processing carried out by the test-content analysis section 54 for of each of test-object musical contents. The characteristic values include the sound volume, rhythm and harmony of each of test-object musical contents. In addition, the characteristic values of a test-object musical content include a genre and an artist, which are each a characteristic determined by a producer or the like for the test-object musical content.

In the example shown in FIG. 9, the characteristic values of test-object musical content 1 include a sound volume of $a_1$, a rhythm of $b_3$, a harmony of $c_3$, a genre of $d_2$, an artist name of $e_1$ and so on whereas the characteristic values of test-object musical content 2 include a sound volume of $a_2$, a rhythm of $b_3$, a harmony of $c_3$, a genre of $d_4$, an artist name of $e_1$ and so on.

By the same token, the characteristic values of test-object musical content 3 include a sound volume of $a_3$, a rhythm of $b_1$, a harmony of $c_1$, a genre of $d_3$, an artist name of $e_3$ and so on whereas the characteristic values of test-object musical content 4 include a sound volume of $a_4$, a rhythm of $b_1$, a harmony of $c_2$, a genre of $d_3$, an artist name of $e_4$ and so on. In the same way, the characteristic values of test-object musical content 5 include a sound volume of $a_2$, a rhythm of $b_3$, a harmony of $c_4$, a genre of $d_4$, an artist name of $e_5$ and so on.

On the basis of such objective characteristic values shown in the table of FIG. 9 as objective characteristic values of each test-object musical content, it is possible to learn the existence of objective characteristic values of test-object musical contents each arousing similar feelings in the users A and B pertaining to the user group X. For example, it is possible to recognize the fact that test-object musical contents 2 and 5 each arousing similar feelings in the users A and B as shown in the table of FIG. 8 are test-object musical contents of the same genre $d_4$ as well as test-object musical contents, which are similar to each other in that their rhythms become faster in the later parts thereof as indicated by a rhythm of $b_3$ and that their sound volumes are $a_2$.

By the same token, it is possible to learn the existence of objective characteristic values of test-object musical contents each arousing similar feelings in the users C and D pertaining to the user group Y. For example, it is possible to recognize the fact that test-object musical contents 1 and 2 each arousing similar feelings in the users C and D as shown in the table of FIG. 9 are test-object musical contents similar to each other in that their singers are both a female having a husky voice indicated the artist name of $e_1$, that the test-object musical contents 1 and 2 each have a unique harmony characteristic indicated by a harmony of $c_3$ and that their rhythms become faster in the later parts thereof as indicated by a rhythm of $b_3$.

The target-content analysis section 55 employed in the biological-information processing section 42 shown in FIG. 4 is a section for carrying out the same signal processing on metadata-setting-target musical contents as the signal processing carried out by the test-content analysis section 54 on test-object musical contents in order to analyze the objective characteristics of the metadata-setting-target musical contents. A metadata-setting-target musical content is defined as a musical content in which metadata is to be set. For this reason, the target-content analysis section 55 also receives the metadata-setting-target musical contents.

Characteristics (the sound volume, the rhythm, the harmony, the genre, the artist and so on) shown in the table of FIG. 10 as characteristics subjected to the signal processing carried out by the target-content analysis section 55 on each metadata-setting-target musical content are the same as the characteristics shown in the table of FIG. 9 as characteristics subjected to the signal processing carried out by the test-content analysis section 54 on each test-object musical content. The target-content analysis section 55 supplies characteristic values obtained as a result of the signal processing carried out thereby on each metadata-setting-target musical content to the metadata setting section 56.

The metadata setting section 56 is a section for setting metadata in metadata-setting-target musical contents as shown in the table of FIG. 10. As shown in the table, the metadata set by the metadata setting section 56 in metadata-setting-target musical contents is category values received from the test-content analysis section 54 and shown in FIG. 8 as the category values of test-object musical contents. The metadata setting section 56 supplies the metadata set in each of the metadata-setting-target musical contents to the content metadata DB 43 to be stored therein.

FIG. 10 shows characteristic values generated by the target-content analysis section 55 as the characteristic values of metadata-setting-target musical contents and metadata set by the metadata setting section 56 in the metadata-setting-target musical contents.

To be more specific, the metadata shown in FIG. 10 is metadata set in metadata-setting-target musical contents 1 to 5. In this case, metadata-setting-target musical contents 1 to 5 are musical contents not included in test-object musical contents. That is to say, a test participating person does not actually listen to metadata-setting-target musical contents 1 to 5 in order for the information processing apparatus 1 to obtain biological information from the test participating person.

In the example shown in FIG. 10, the characteristic values of metadata-setting-target musical content 1 include a sound volume of $a_2$, a rhythm of $b_3$, a harmony of $c_4$, a genre of $d_3$, an artist name of $e_5$ and so on whereas the characteristic values of metadata-setting-target musical content 2 include a sound volume of $a_4$, a rhythm of $b_1$, a harmony of $c_1$, a genre of $d_3$, an artist name of $e_3$ and so on.

By the same token, the characteristic values of metadata-setting-target musical content 3 include a sound volume of $a_2$, a rhythm of $b_1$, a harmony of $c_1$, a genre of $d_3$, an artist name of $e_3$ and so on whereas the characteristic values of metadata-setting-target musical content 4 include a sound volume of $a_2$, a rhythm of $b_2$, a harmony of $c_2$, a genre of $d_4$, an artist name of $e_1$ and so on. In the same way, the characteristic values of test-object musical content 5 include a sound volume of $a_1$, a rhythm of $b_2$, a harmony of $c_3$, a genre of $d_2$, an artist name of $e_2$ and so on.

By comparing the objective characteristic values of the test-object musical contents with the objective characteristic values of the metadata-setting-target musical contents, the metadata setting section 56 detects any metadata-setting-target musical contents having objective characteristic values similar to the objective characteristic values of any specific ones of the test-object musical contents and sets particular category values shown in FIG. 8 as the category values of the specific test-object musical contents in each of the detected metadata-setting-target musical contents as metadata.

That is to say, by comparison of objective characteristic values obtained by carrying out signal processing or the like as described above, information representing biological reactions considered to be reactions, which are probably exhibited by test participating persons if the test participating persons are actually listening to metadata-setting-target contents, is inferred as category values from actual subjective biological information obtained when the test participating persons are actually listening to test-object musical contents. Then the category values obtained as a result of the inference are set in the metadata-setting-target musical contents as metadata.

To put it concretely, in the example shown in FIG. 10, metadata-setting-target musical content 1 is detected as a musical content having characteristics similar to those of test-object musical content 5 shown in FIG. 9 in that the characteristic values of both the contents include the same sound volume of $a_2$, the same rhythm of $b_3$, the same harmony of $c_4$ and the same artist name of $e_5$. Thus, category values of $X_3$ and $Y_2$ assigned to test-object musical content 5 serving as an assignee listened to by test participating persons pertaining to the user groups X and Y respectively are set in metadata-setting-target musical content 1 as metadata in order to treat metadata-setting-target musical content 1 like test-object musical content 5. As described earlier, the category value of $X_3$ is the value indicates that specific users pertaining to the user group X will exhibit similar biological reactions representing the feelings of the specific users when listening to test-object musical content 5. By the same token, the category value of $Y_2$ is the value indicates that specific users pertaining to the user group Y will exhibit similar biological reactions representing the feelings of the specific users when listening to test-object musical content 5.

In addition, metadata-setting-target musical content 2 is detected as a musical content having characteristics similar to those of test-object musical content 4 shown in FIG. 9 in that the characteristic values of both the contents include the same sound volume of $a_4$, the same rhythm of $b_1$ and the same genre of $d_3$. Thus, category values of $X_1$ and $Y_4$ assigned to test-object musical content 4 serving as an assignee listened to by test participating persons pertaining to the user groups X and Y respectively are set in metadata-setting-target musical content 2 as metadata. As described above, the category value of $X_1$ is the value indicates that specific users pertaining to the user group X will exhibit similar biological reactions representing the feelings of the specific users when listening to test-object musical content 4. By the same token, the category value of $Y_4$ is the value indicates that specific users pertaining to the user group Y will exhibit similar biological reactions representing the feelings of the specific users when listening to test-object musical content 4.

On top of that, metadata-setting-target musical content 3 is detected as a musical content having characteristics similar to those of test-object musical content 3 shown in FIG. 9 in that the characteristic values of both the contents include the same rhythm of b1, the same harmony of $c_1$, the same genre of $d_3$ and the same artist name of $e_3$. Thus, category values of $X_1$ and $Y_3$ assigned to test-object musical content 3 serving as an assignee listened to by test participating persons pertaining to the user groups X and Y respectively are set in metadata-setting-target musical content 3 as metadata. As described above, the category value of $X_1$ is the value indicates that specific users pertaining to the user group X will exhibit similar biological reactions representing the feelings of the specific users when listening to test-object musical content 3. By the same token, the category value of $Y_3$ is the value indicates that specific users pertaining to the user group Y will exhibit similar biological reactions representing the feelings of the specific users when listening to test-object musical content 3.

In addition, metadata-setting-target musical content 4 is detected as a musical content having characteristics similar to those of test-object musical content 2 shown in FIG. 9 in that the characteristic values of both the contents include the same sound volume of $a_2$, the same genre of $d_4$ and the artist name of $e_1$. Thus, category values of $X_3$ and $Y_1$ assigned to test-object musical content 2 serving as an assignee listened to by test participating persons pertaining to the user groups X and Y respectively are set in metadata-setting-target musical content 4 as metadata. As described above, the category value of $X_3$ is the value indicates that specific users pertaining to the user group X will exhibit similar biological reactions representing the feelings of the specific users when listening to test-object musical content 2. By the same token, the category value of $Y_1$ is the value indicates that specific users pertaining to the user group Y will exhibit similar biological reactions representing the feelings of the specific users when listening to test-object musical content 2.

On top of that, metadata-setting-target musical content 5 is detected as a musical content having characteristics similar to those of test-object musical content 1 shown in FIG. 9 in that the characteristic values of both the contents include the same sound volume of $a_1$, the same harmony of $c_3$ and the same genre of $d_2$. Thus, category values of $X_2$ and $Y_1$ assigned to test-object musical content 1 serving as an assignee listened to by test participating persons pertaining to the user groups X and Y respectively are set in metadata-setting-target musical content 5 as metadata. As described above, the category value of $X_2$ is the value indicates that specific users pertaining to the user group X will exhibit similar biological reactions representing the feelings of the specific users when listening to test-object musical content 1. By the same token, the category value of $Y_1$ is the value indicates that specific users pertaining to the user group Y will exhibit similar biological reactions representing the feelings of the specific users when listening to test-object musical content 1.

As shown in FIG. 10, metadata-setting-target musical contents 1 and 4 share the same category value of $X_3$ but have different category values of $Y_2$ and $Y_1$ respectively. Thus, specific users pertaining to the user group X will exhibit similar biological reactions representing the feelings of the specific users when listening to metadata-setting-target musical contents 1 and 4. However, users pertaining to the user group Y will exhibit biological reactions representing the feelings of the users when listening to metadata-setting-target musical content 1 but users pertaining to the user group Y will exhibit different biological reactions representing the feelings of the users when listening to metadata-setting-target musical content 4.

By the same token, metadata-setting-target musical contents 2 and 3 share the same category value of $X_1$ but have different category values of $Y_4$ and $Y_3$ respectively. Thus, specific users pertaining to the user group X will exhibit similar biological reactions representing the feelings of the specific users when listening to metadata-setting-target musical contents 2 and 3. However, users pertaining to the user group Y will exhibit biological reactions representing the feelings of the users when listening to metadata-setting-target musical content 2 but users pertaining to the user group Y will exhibit different biological reactions representing the feelings of the users when listening to metadata-setting-target musical content 3.

In the same way, metadata-setting-target musical contents 4 and 5 share the same category value of $Y_1$ but have different category values of $X_3$ and $X_2$ respectively. Thus, specific users pertaining to the user group Y will exhibit similar biological reactions representing the feelings of the specific users when listening to metadata-setting-target musical contents 4 and 5. However, users pertaining to the user group X will exhibit biological reactions representing the feelings of the users when listening to metadata-setting-target musical content 4 but users pertaining to the user group X will exhibit different biological reactions representing the feelings of the users when listening to metadata-setting-target musical content 5.

Metadata set in the metadata-setting-target musical contents as described above is stored in the content metadata DB 43 and are used in a process to recommend a musical content to a user as will be described later.

Next, processing carried out by the information processing apparatus 1 having the configuration described above is explained.

Figure 11:
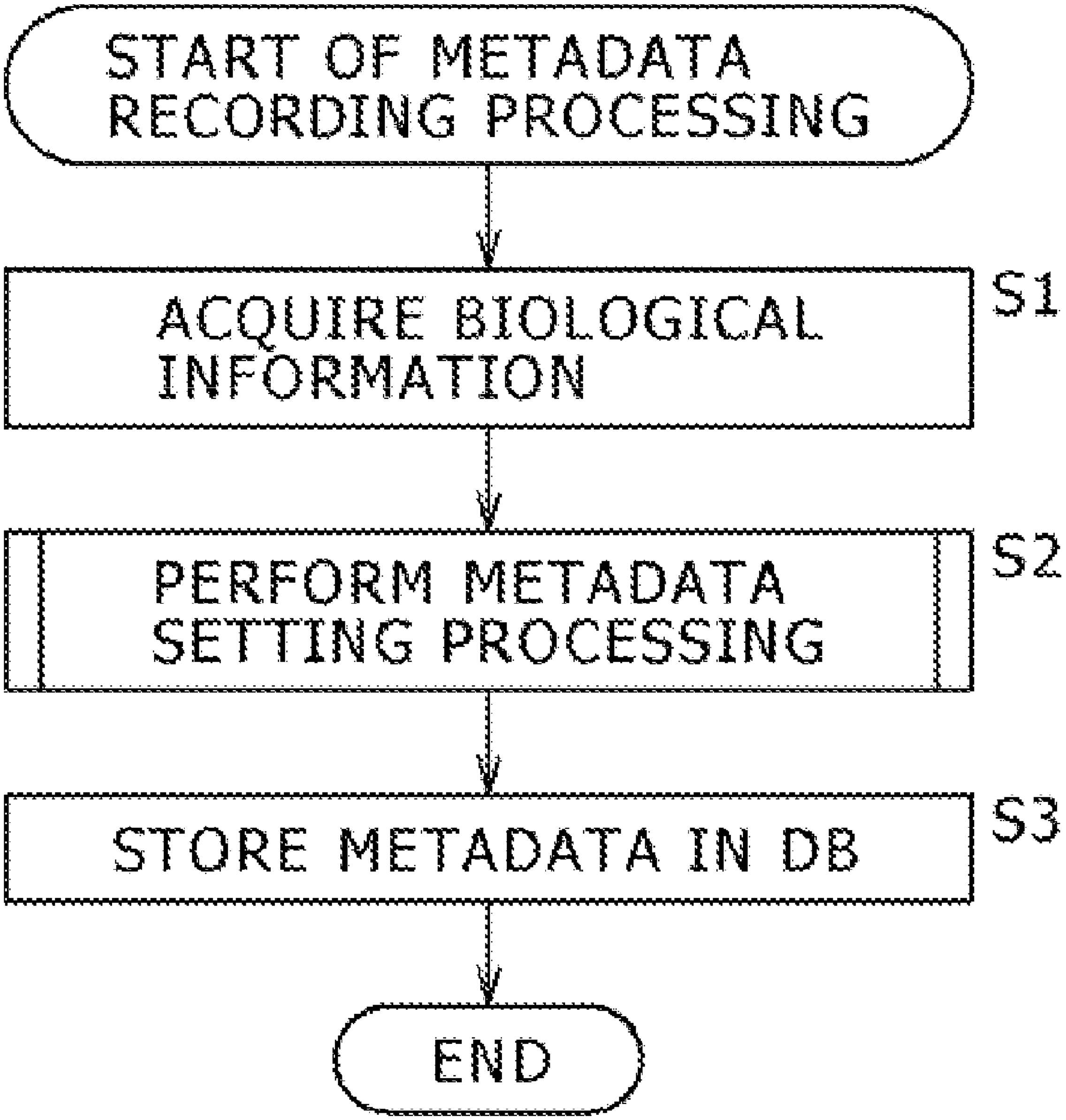
FIG. 11 shows a flowchart to be referred to in explanation of processing carried out by the information processing apparatus to record metadata set in metadata-setting-target musical contents into a database.

First of all, processing carried out by the information processing apparatus 1 to record metadata is described by referring to a flowchart shown in FIG. 11. This processing is started for example when a test-object musical content is reproduced with the head gear 2 mounted on the head of a test participating person.

The flowchart begins with a step S1 at which the biological-information acquisition section 41 included in the preprocessing section 31 acquires biological information from the head gear 2 on the basis of a signal generated by the head gear 2, and supplies the biological information to the biological-information processing section 42.

Then, at the next step S2, the biological-information processing section 42 carries out metadata setting processing to set metadata in a metadata-setting-target musical content. Details of the metadata setting processing will be described later by referring to a flowchart shown in FIG. 12.

Then, at the next step S3, the content metadata DB 43 stores the metadata set in the metadata-setting-target musical content supplied from the biological-information processing section 42 in the content metadata DB 43. Finally, the processing carried out by the information processing apparatus 1 to record metadata is ended. The metadata stored in the content metadata DB 43 is used properly in a process to recommend a musical content to a user as will be described later.

For example, when the user makes a request to recommend a musical content similar to metadata-setting-target musical content 1 shown in FIG. 10 to the user while metadata-setting-target musical content 1 is being reproduced, the information processing apparatus 1 searches for a musical content having the same metadata as the category values of $X_3$ and $Y_2$ set in metadata-setting-target musical content 1 as metadata, and recommends the musical content to the user.

By making a request to recommend a musical content similar to metadata-setting-target musical content 1 to the user while metadata-setting-target musical content 1 is being reproduced by the information processing apparatus 1 because the user feels pleasant while listening to metadata-setting-target musical content 1, the user can similarly feel pleasant by being able to listen to the musical content to be reproduced next.

Figure 12:
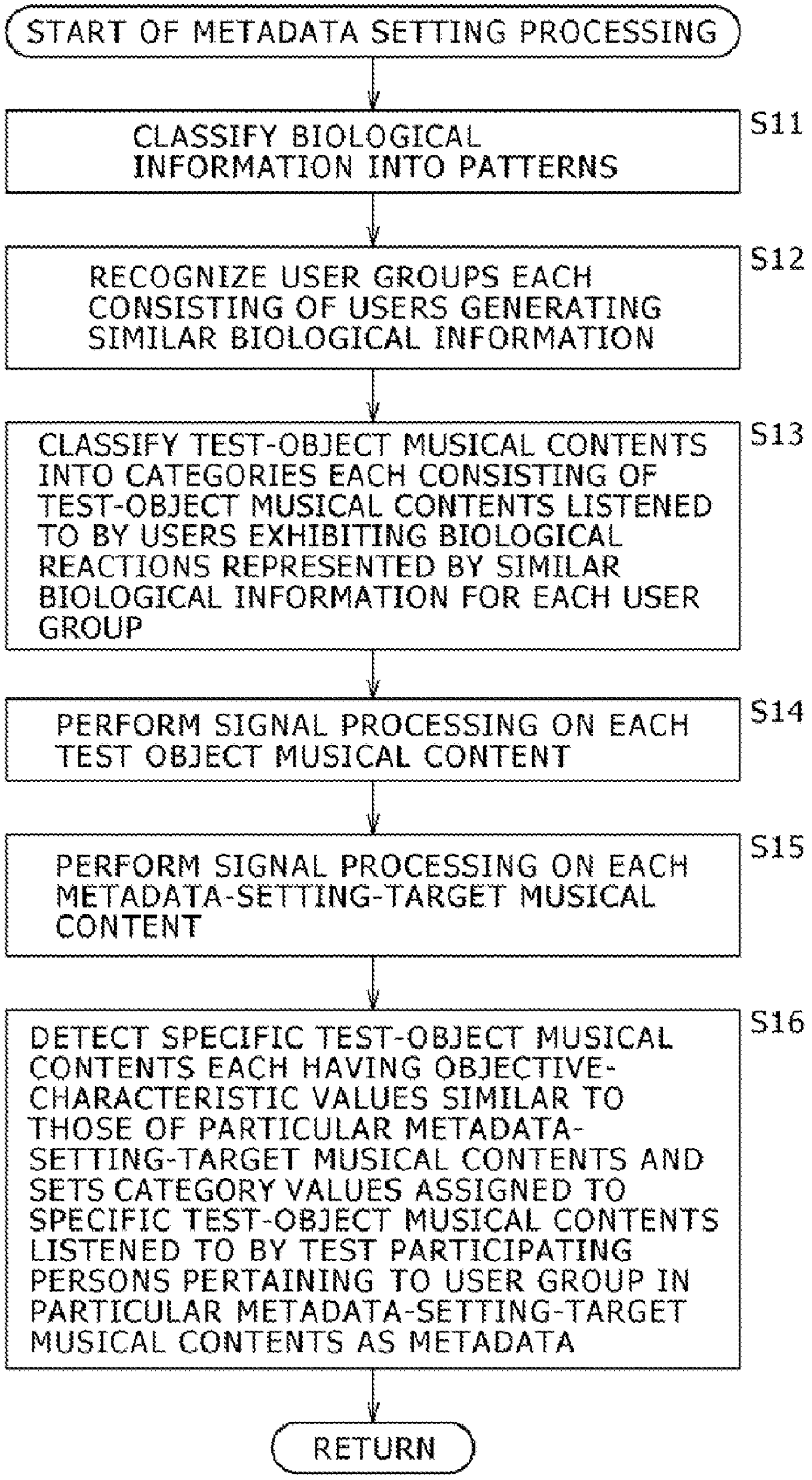
FIG. 12 shows a flowchart to be referred to in explanation of processing carried out at a step S2 of the flowchart shown in FIG. 11 to set metadata in a metadata-setting-target musical content.

Next, by referring to the flowchart shown in FIG. 12, details of the metadata setting processing carried out at the step S2 of the flowchart shown in FIG. 11 are explained.

The flowchart shown in FIG. 12 begins with a step S11 at which the biological-information classification section 51 included in the biological-information processing section 42 classifies biological information received from the biological-information acquisition section 41 into patterns and supplies the patterns obtained as the result of the classification to the user-group identification section 52.

Then, at the step S12, the user-group identification section 52 recognizes user groups each consisting of users exhibiting similar biological reactions when listening to each of the same musical contents and supplies information on the user groups and biological information representing the biological reactions to the test-content classification section 53.

Then, at the step S13, for each individual one of all test-object musical contents, the test-content classification section 53 identifies specific users (or test participating persons described before) included in each of the user groups as users exhibiting biological reactions represented by similar biological information when listening to the individual test-object musical content on the basis of the information on each user group and the biological information, which are received from the user-group identification section 52, and assigns a category value to the individual test-object musical content in order to indicate that the specific users exhibit similar biological reactions when listening to the individual test-object musical content.

Then, at the step S14, the test-content analysis section 54 carries out signal processing on each test-object musical content in order to find values of objective characteristics of the test-object musical content and supplies the characteristic values obtained as a result of the signal processing to the metadata setting section 56 along with the category information received from the test-content classification section 53.

Subsequently, at the step S15, the target-content analysis section 55 carries out signal processing on each metadata-setting-target musical content in order to find values of objective characteristics of the metadata-setting-target musical content and supplies the characteristic values obtained as a result of the signal processing to the metadata setting section 56.

Then, at the step S16, the metadata setting section 56 detects specific test-object musical contents having objective-characteristic values similar to those of particular metadata-setting-target musical contents and sets category values assigned to the specific test-object musical contents each serving as an assignee listened to by test participating persons pertaining to a user group in the particular metadata-setting-target musical contents as metadata.

Then, the flow of the processing goes back to the step S2 of the flowchart shown in FIG. 11 to continue the processing from the step S3 following the step S2.

In the description given so far, the apparatus for recommending a musical content to the user is the information processing apparatus 1 itself, which also sets metadata as described above. However, it is possible to provide a configuration in which an apparatus other than the information processing apparatus 1 is used for recommending a musical content to the user of the other apparatus on the basis of metadata set by the information processing apparatus 1. In this case, metadata set by the information processing apparatus 1 is presented to the other apparatus for recommending a musical content to the user of the other apparatus typically through a communication making use of a network.

In a process to present metadata to the other apparatus for recommending a musical content to the user of the other apparatus, other information is also presented to the other apparatus for recommending a musical content to the user. The other information includes information on test-object musical contents and user groups as well as biological information received from test participating persons. The information on test-object musical contents and user groups is used in a process to determine a user group including the user to which a musical content is to be recommended. Before a musical content is recommended to the user of the other apparatus, the user needs to serve as a test participating person listening to a test-object musical content in order to give biological information representing a biological reaction exhibited by the user when listening to the test-object musical content and request the other apparatus serving as a musical-content recommendation apparatus to determine a user group including the user itself. Thus, the head gear 2 like the one shown in FIG. 1 is also connected to the musical-content recommendation apparatus for recommending a musical content to the user of the apparatus.

FIG. 13 is a block diagram showing an information processing apparatus 61 serving as the musical-content recommendation apparatus for recommending a musical content to the user of the apparatus on the basis of metadata set by the information processing apparatus 1.

The information processing apparatus 61 has a hardware configuration identical with the configuration shown in FIG. 2. Thus, in the following description, the configuration shown in FIG. 2 is properly referred to as the configuration of the information processing apparatus 61.

As shown in FIG. 13, the information processing apparatus 61 includes functional sections such as a biological-information acquisition section 71, a user-group identification section 72, a content metadata DB 73 and a content recommendation section 74. At least some of the functional sections shown in FIG. 13 are implemented by programs each determined in advance as a program to be executed by the CPU 11 employed in the hardware configuration of the information processing apparatus 61 shown in FIG. 2.

The biological-information acquisition section 71 is a section for acquiring biological information on the basis a signal received from the head gear 2 mounted on the head of the user of the information processing apparatus 61 and passing on the acquired information to the user-group identification section 72.

The user-group identification section 72 is a section for recognizing a user group including the user of the information processing apparatus 61 on the basis of biological information received from the biological-information acquisition section 71.

The process carried out by the user-group identification section 72 to recognize a user group is identical with the process carried out by the user-group identification section 52 employed in the biological-information processing section 42 shown in FIG. 4 to recognize a user group. That is to say, the user-group identification section 72 classifies biological information received from the biological-information acquisition section 71 as biological information into patterns, and recognizes a user group representing the patterns as a user group including the user in the same way as the user-group identification section 52 does. Then, the user-group identification section 72 selects a user group among the user groups received from the information processing apparatus 1 as a user group of test participating persons each exhibiting biological reactions represented by biological information of patterns similar to the patterns of biological information representing biological reactions exhibited by the user of the information processing apparatus 61. The user-group identification section 72 determines the selected user group as the same group as the recognized user group including the user of the information processing apparatus 61. That is to say, the information processing apparatus 61 treats the user of the information processing apparatus 61 like a user pertaining to the determined user group.

To put it concretely, let us assume for example that the pieces of biological information shown in FIG. 6 as biological information representing biological reactions exhibited by users A to D each serving as a test participating person when listening to test-object musical contents 1 to 5 have been transmitted to the information processing apparatus 61 from the information processing apparatus 1 typically by way of a network. In addition, let us also assume that the user-group identification section 72 classifies biological information generated by the user of the information processing apparatus 61 into a pattern $P_{1-1}$ forming the shape of biological information representing a biological reaction exhibited by the user of the information processing apparatus 61 when listening to test-object musical content 1, a pattern $P_{2-1}$ forming the shape of biological information representing a biological reaction exhibited by the user when listening to test-object musical content 2, a pattern $P_{3-1}$ forming the shape of biological information representing a biological reaction exhibited by the user when listening to test-object musical content 3, a pattern $P_{4-1}$ forming the shape of biological information representing a biological reaction exhibited by the user when listening to test-object musical content 4 and a pattern $P_{5-1}$ forming the shape of biological information representing a biological reaction exhibited by the user when listening to test-object musical content 5. In this case, the user-group identification section 72 determines the user group X including the users A and B each exhibiting biological reactions represented biological information of patterns similar to the patterns of biological information representing biological reactions exhibited by the user of the information processing apparatus 61 as the same group as the user group of the user. That is to say, the information processing apparatus 61 treats the user of the information processing apparatus 61 like the users A and B pertaining to the user group X.

The user-group identification section 72 supplies information on the determined user group to the content recommendation section 74.

The content metadata DB 73 is a memory used for storing metadata received from the information processing apparatus 1. The metadata stored in the content metadata DB 73 is the same as the metadata stored in the content metadata DB 43 employed in the information processing apparatus 1.

The content recommendation section 74 is a section for recommending a musical content to the user by making use of only the metadata for the user group determined by the user-group identification section 72. Metadata for a user group is category values assigned to (or set in) test-object musical contents each serving as an assignee listened to by test participating persons pertaining to the user group. The metadata for the user group is selected from the metadata stored in the content metadata DB 73.

To put it concretely, if the user of the information processing apparatus 61 is treated as a user pertaining to the user group X as described above, the content recommendation section 74 recommends a musical content to the user by making use of only the metadata for the user group X determined by the user-group identification section 72. In this case, the metadata for the user group X is the category values of $X_3$, $X_1$, $X_1$, $X_3$, $X_2$ and so on, which are assigned to test-object musical contents each serving as an assignee listened to by test participating persons pertaining to the user group X as shown in FIG. 10, but not the category values of $Y_2$, $Y_4$, $Y_3$, $Y_1$, $Y_{12}$ and so on, which are assigned to test-object musical contents each serving an assignee listened to by test participating persons pertaining to the user group Y as shown in the same figure. That is to say, only the category values of $X_3$, $X_1$, $X_1$, $X_3$, $X_2$ and so on are the metadata for the user group X and, thus, the content recommendation section 74 recommends a musical content to the user by making use of only the category values of $X_3$, $X_1$, $X_1$, $X_3$, $X_2$.

For example, if metadata-setting-target musical content 1 shown in FIG. 10 is being reproduced by the information processing apparatus 61, the user of the information processing apparatus 61 requests the information processing apparatus 61 to recommend a musical content similar to metadata-setting-target musical content 1 presently being reproduced and the user has been determined by the user-group identification section 72 to be a user pertaining to the user group X, the content recommendation section 74 recommends metadata-setting-target musical content 4 to the user. This is because the category value set in metadata-setting-target musical content 4 as metadata is the category value of $X_3$, which is the same as the category value set in metadata-setting-target musical content 1 as metadata. As described earlier, the category value of $X_3$ has been assigned to test-object musical content 2 serving as an assignee listened to by test participating persons pertaining to the user group X.

In this way, the content recommendation section 74 is capable of recommending a musical content to the user of the information processing apparatus 61 by making use of only metadata for the user group including the user, that is, by making use only metadata matching the way adopted by the user as a way of listening to a metadata-setting-target musical content being reproduced.

Figure 14:
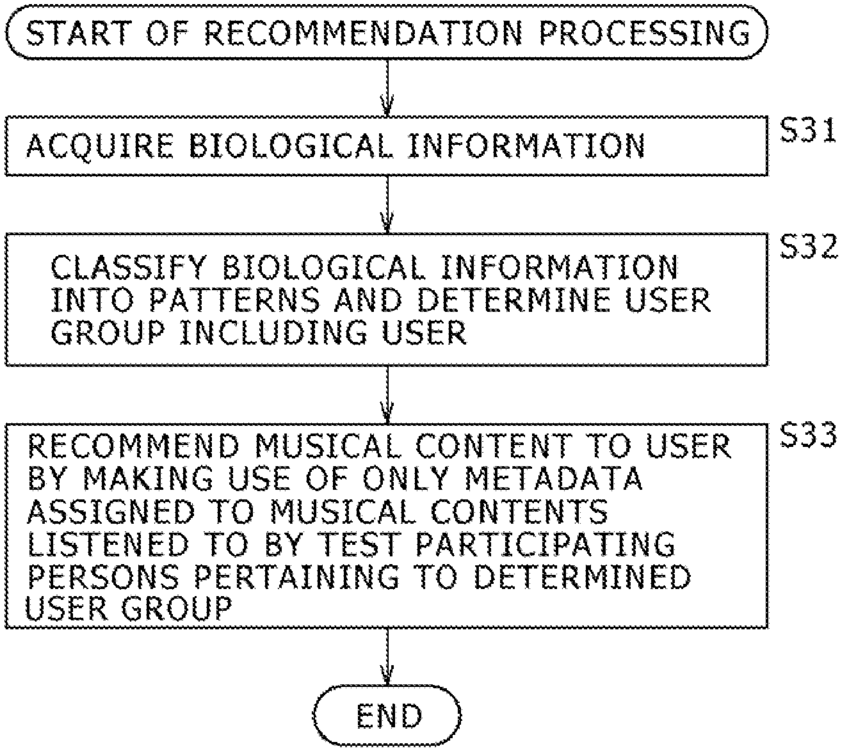
FIG. 14 shows a flowchart to be referred to in explanation of processing carried out by the information processing apparatus shown in FIG. 13 to recommend a musical content to a user.

Next, processing carried out by the information processing apparatus 61 to recommend a musical content to the user is explained by referring to a flowchart shown in FIG. 14 as follows.

As shown in the figure, the flowchart begins with a step S31 the biological-information acquisition section 71 acquires biological information on the basis a signal received from the head gear 2 mounted on the head of the user of the information processing apparatus 61 and passes on the acquired information to the user-group identification section 72.

Then, at the next step S32, the user-group identification section 72 determines a user group including the user of the information processing apparatus 61 on the basis of the biological information received from the biological-information acquisition section 71 and user groups transmitted by the information processing apparatus 1 typically by way of a network. The user group includes a test-object musical content generating biological information of a pattern similar to the pattern of the biological information generated by the user.

Then, at the next step S33, the content recommendation section 74 recommends a musical content to the user by making use of only specific metadata selected from pieces of metadata transmitted by the information processing apparatus 1 and stored in the content metadata DB 73 as specific metadata for the user group determined in the process carried out by the user-group identification section 72 at the step S32. Finally, execution of the processing to recommend a musical content to the user is ended.

In accordance with the description given so far, a test participating person exhibits a biological reaction represented by biological information to be used in a metadata setting process and other processing while listening to a reproduced test-object musical content when a near infrared ray is radiated to the head of the test participating person. In this case, any biological reaction exhibited by the test participating person listening to a reproduced test-object musical content can be used as long as the biological reaction varies from content to content.

In addition, it is also possible to provide a configuration in which metadata is set on the basis of biological information representing a plurality of biological reactions instead of making use of biological information representing only 1 biological reaction. If a plurality of biological reactions can be exhibited, specific biological reactions each substantially varying from user to user and/or from content to content are selected from the exhibited biological reactions and biological information representing the specific biological reactions is used in a process to set metadata.

In addition, it is also possible to provide a configuration in which biological information generated by a plurality of test participating persons is set in musical contents as it is as metadata without classifying the test participating persons into user groups.

In the description described above, the metadata-setting-target content in which metadata is set is a musical content. However, a moving-picture content and a still-picture content can also each be taken as a metadata-setting-target content in the same way as a musical content.

For example, metadata is set in a moving-picture content on the basis of a biological reaction exhibited by a user viewing and listening to the moving-picture content reproduced as a test object content. By the same token, metadata is set in a still-picture content on the basis of a biological reaction exhibited by a user viewing the still-picture content reproduced as a test object content.

The series of processes described previously can be carried out by hardware and/or execution of software. If the series of processes described above is carried out by execution of software, programs composing the software can be installed into a computer embedded in dedicated hardware, a general-purpose personal computer or the like, which can be made capable of carrying out a variety of functions by installing a variety of programs into the personal computer.

The recording medium used for recording programs to be installed into a computer or a general-purpose personal computer as programs to be executed by the computer or the general-purpose personal computer respectively is the removable recording medium 20 mounted on the information processing apparatus 1 shown in FIG. 2. Examples of the removable recording medium 20 also each referred to as a package medium include a magnetic disk such as a flexible disk, an optical disk such as a CD-ROM (Compact Disk-Read Only Memory) or a DVD (Digital Versatile Disk), a magneto-optical disk such as an MD (Mini Disk) as well as a semiconductor memory. Instead of installing the programs from the removable recording medium 20, the programs can also be downloaded from a program provider through wire or radio transmission media such as the aforementioned LAN, the Internet cited above or a digital broadcasting satellite.

It is worth noting that, in this specification, the programs to be executed by the computer or the general-purpose personal computer can be programs to be carried out not only in a pre-prescribed order along the time axis, but also programs to be carried out concurrently or with required timings such as invocations of the programs.

Implementations of the present invention are by no means limited to the embodiments described above. For example, it is possible to make a variety of changes to the embodiments within a range not deviating from essentials of the present invention.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information processing method executed by a computer for carrying out processing to recommend contents data to a user on the basis of metadata set in metadata-setting-target contents data on the basis of biological reactions exhibited by test participating persons each serving as a test participant during processes to output a plurality of test-object contents data listened to by said test participating persons, the information processing method comprising the steps of:

identifying a user group including test participating persons exhibiting similar biological reactions;

primarily carrying out a signal processing in order to analyze every one of said test-object contents data output to cause test participating persons pertaining to each of said user groups identified by said user group identification section to exhibit similar biological reactions and to analyze said test-object contents data in which metadata is to be set;

secondarily carrying out signal processing in order to analyze said metadata-setting-target contents data in which metadata is to be set;

setting metadata in said metadata-setting-target contents data as metadata expressing information representing similar biological reactions exhibited by said test participating persons pertaining to the same user group when listening to said test-object contents data analyzed by said primarily carried out signal processing to give an analysis result similar to an analysis result of said secondarily carried out signal processing on said metadata-setting-target contents data, determining a user group including test participating persons exhibiting biological reactions during processes to output said test-object contents data as biological reactions similar to biological reactions exhibited by said user, to which said contents data is to be recommended, during processes to output said test-object contents data so as to include said user in the same user group as said determined user group; and recommending contents data to said user on the basis of specific information selected from information, which has been set as metadata in metadata-setting-target contents data, as specific information representing biological reactions exhibited by test participating persons pertaining to the same user group as said user group determined at said user group identification step.

2. A computer-readable storage device storing a computer program, which, when executed by a processor, causes a computer to perform an information processing method adopted by an information processing apparatus for recommending contents data to a user on the basis of metadata set in metadata-setting-target contents data on the basis of biological reactions exhibited by test participating persons each serving as a test participant during processes to output a plurality of test-object contents data listened to by said test participating persons, said information processing method comprising:

identifying a user group including test participating persons exhibiting similar biological reactions;

primarily carrying out signal processing in order to analyze every one of said test-object contents data output to cause test participating persons pertaining to each of said user groups identified by said user group identification step to exhibit similar biological reactions and further configured to analyze said test-object contents data in which metadata is to be set;

secondarily carrying out signal processing in order to analyze said metadata-setting-target contents data in which metadata is to be set;

setting metadata in said metadata-setting-target contents data as metadata expressing information representing similar biological reactions exhibited by said test participating persons pertaining to the same user group when listening to said test-object contents data analyzed by said primarily carried out signal processing to give an analysis result similar to an analysis result of said secondarily carried out signal processing on said metadata-setting-target contents data;

determining a user group including test participating persons exhibiting biological reactions during processes to output said test-object contents data as biological reactions similar to biological reactions exhibited by said user, to which said contents data is to be recommended, during processes to output said test-object contents data so as to include said user in the same user group as said determined user group; and recommending contents data to said user on the basis of specific information selected from information, which has been set as metadata in metadata-setting-target contents data, as specific information representing biological reactions exhibited by test participating persons pertaining to the same user group as said user group determined at said user group identification step.

3. An information processing apparatus for recommending contents data to a user on the basis of metadata set in metadata-setting-target contents data on the basis of biological reactions exhibited by test participating persons each serving as a test participant during processes to output a plurality of test-object contents data listened to by said test participating persons by an apparatus comprising:

a processor, and a memory coupled to the processor, wherein the memory is encoded with one or more instructions that, when executed by the processor, define:

a first user group identification section configured to identify a user group including test participating persons exhibiting similar biological reactions;

a first content analysis section configured to carry out signal processing in order to analyze every one of said test-object contents data output to cause test participating persons pertaining to each of said user groups identified by said first user group identification section to exhibit similar biological reactions and further configured to analyze said test-object contents data in which metadata is to be set;

a second content analysis section configured to carry out signal processing in order to analyze said metadata-setting-target contents data in which metadata is to be set;

a metadata setting section configured to set metadata in said metadata-setting-target contents data as metadata expressing information representing similar biological reactions exhibited by said test participating persons pertaining to the same user group when listening to said test-object contents data analyzed by said first content analysis section to give an analysis result similar to an analysis result of said signal processing carried out by said second content analysis section on said metadata-setting-target contents data;

a second user group identification section configured to determine a user group including test participating persons exhibiting biological reactions during processes to output said test-object contents data as biological reactions similar to biological reactions exhibited by said user, to which said contents data is to be recommended, during processes to output said test-object contents data so as to include said user in the same user group as said determined user group; and a content recommendation section configured to recommend contents data to said user on the basis of specific information selected from information, which has been set as metadata in metadata-setting-target contents data, as specific information representing biological reactions exhibited by test participating persons pertaining to the same user group as said user group determined by said second user group identification section.

4. An information processing apparatus for setting metadata in metadata-setting-target contents data on the basis of biological reactions exhibited by test participating persons each serving as a test participant during processes to output a plurality of test-object contents data listened to by said test participating persons, said information processing apparatus comprising:

a processor, and a memory coupled to the processor, wherein the memory is encoded with one or more instructions that, when executed by the processor, define:

a user group identification section configured to identify a user group including test participating persons exhibiting similar biological reactions;

a first content analysis section configured to carry out signal processing in order to analyze every one of said test-object contents data output to cause test participating persons pertaining to each of said user groups identified by said user group identification step to exhibit similar biological reactions and further configured to analyze said test-object contents data in which metadata is to be set;

a second content analysis section configured to carry out signal processing in order to analyze said metadata-setting-target contents data in which metadata is to be set; and a metadata setting section configured to set metadata in said metadata-setting-target contents data as metadata expressing information representing similar biological reactions exhibited by said test participating persons pertaining to the same user group when listening to said test-object contents data analyzed by said first content analysis section to give an analysis result similar to an analysis result of said signal processing carried out by said second content analysis section on said metadata-setting-target contents data.

5. The information processing apparatus according to claim 4, wherein the one or more instructions that, when executed by the processor, further define a metadata recording section configured to record metadata set by said metadata setting section in the memory.

6. The information processing apparatus according to claim 4, wherein the one or more instructions that, when executed by the processor, further define a content recommendation section configured to recommend a content to a user on the basis of said metadata recorded by said metadata recording section.

7. A computer-readable storage device storing a computer program, which, when executed by a processor, causes a computer to perform an information processing method adopted by an information processing apparatus for setting metadata in metadata-setting-target contents data on the basis of biological reactions exhibited by test participating persons each serving as a test participant during processes to output a plurality of test-object contents data listened to by said test participating persons, said information processing method comprising the steps of:

identifying a user group including test participating persons exhibiting similar biological reactions;

primarily carrying out signal processing in order to analyze every one of said test-object contents data output to cause test participating persons pertaining to each of said user groups identified at said user group identification step to exhibit similar biological reactions and to analyze said test-object contents data in which metadata is to be set;

secondarily carrying out signal processing in order to analyze said metadata-setting-target contents data in which metadata is to be set; and setting metadata in said metadata-setting-target contents data as metadata expressing information representing similar biological reactions exhibited by said test participating persons pertaining to the same user group during a process to output said test-object contents data analyzed by said primarily carried out signal processing to give an analysis result similar to an analysis result of said secondarily carried out signal processing on said metadata-setting-target contents data.

8. An information processing method executed by a computer to carry out processing to set metadata in metadata-setting-target contents data on the basis of biological reactions exhibited by test participating persons each serving as a test participant during processes to output a plurality of test-object contents data listened to by said test participating persons, said information processing program comprising the steps of:

identifying a user group including test participating persons exhibiting similar biological reactions;

primarily carrying out signal processing in order to analyze every one of said test-object contents data output to cause test participating persons pertaining to each of said user groups identified at said user group identification step to exhibit similar biological reactions and to analyze said test-object contents data in which metadata is to be set;

secondarily carrying out signal processing in order to analyze said metadata-setting-target contents data in which metadata is to be set; and setting metadata in said metadata-setting-target contents data as metadata expressing information representing similar biological reactions exhibited by said test participating persons pertaining to the same user group during a process to output said test-object contents data analyzed by said primarily carried out signal processing to give an analysis result similar to an analysis result of said secondarily carried out signal processing on said metadata-setting-target contents data.

9. An information processing apparatus for setting metadata in metadata-setting-target contents data on the basis of biological reactions exhibited by test participating persons each serving as a test participant during processes to output a plurality of test-object contents data listened to by said test participating persons, said information processing apparatus comprising:

a processor, and a memory coupled to the processor, wherein the memory is encoded with one or more instructions that, when executed by the processor, are configured to:

identify a user group including test participating persons exhibiting similar biological reactions;

carry out signal processing in order to analyze every one of said test-object contents data output to cause test participating persons pertaining to each of said identified user groups to exhibit similar biological reactions and to analyze said test-object contents data in which metadata is to be set;

carry out signal processing in order to analyze said metadata-setting-target contents data in which metadata is to be set; and set metadata in said metadata-setting-target contents data as metadata expressing information representing similar biological reactions exhibited by said test participating persons pertaining to the same user group when listening to said test-object contents data analyzed by said signal processing to give an analysis result similar to an analysis result of said signal processing carried out on said metadata-setting-target contents data.

10. An information processing apparatus for recommending contents data to a user on the basis of metadata set in metadata-setting-target contents data on the basis of biological reactions exhibited by test participating persons each serving as a test participant during processes to output a plurality of test-object contents data listened to by said test participating persons by an apparatus comprising:

a processor, and a memory coupled to the processor, wherein the memory is encoded with one or more instructions that, when executed by the processor, are configured to:

identify a user group including test participating persons exhibiting similar biological reactions;

carry out signal processing in order to analyze every one of said test-object contents data output to cause test participating persons pertaining to each of said identified user groups to exhibit similar biological reactions and to analyze said test-object contents data in which metadata is to be set;

carry out signal processing in order to analyze said metadata-setting-target contents data in which metadata is to be set;

set metadata in said metadata-setting-target contents data as metadata expressing information representing similar biological reactions exhibited by said test participating persons pertaining to the same user group when listening to said test-object contents data analyzed by said signal processing to give an analysis result similar to an analysis result of said signal processing carried out on said metadata-setting-target contents data; and determine a user group including test participating persons exhibiting biological reactions during processes to output said test-object contents data as biological reactions similar to biological reactions exhibited by said user, to which said contents data is to be recommended, during processes to output said test-object contents data so as to include said user in the same user group as said determined user group; and recommend contents data to said user on the basis of specific information selected from information, which has been set as metadata in metadata-setting-target contents data, as specific information representing biological reactions exhibited by test participating persons pertaining to the same user group as said determined by user group.

* * * * *